United States Patent
Ohtani et al.

(10) Patent No.: US 7,948,585 B2
(45) Date of Patent: May 24, 2011

(54) INKJET INK FOR COLOR FILTER, COLOR FILTER, METHODS OF PRODUCING THEM, AND LIQUID CRYSTAL DISPLAY DEVICE USING THEM

(75) Inventors: Shigeaki Ohtani, Fujinomiya (JP); Minoru Maeda, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 250 days.

(21) Appl. No.: 12/279,809

(22) PCT Filed: Feb. 20, 2007

(86) PCT No.: PCT/JP2007/053089
§ 371 (c)(1),
(2), (4) Date: Aug. 18, 2008

(87) PCT Pub. No.: WO2007/097331
PCT Pub. Date: Aug. 30, 2007

(65) Prior Publication Data
US 2010/0220268 A1  Sep. 2, 2010

(30) Foreign Application Priority Data
Feb. 22, 2006  (JP) ................................. 2006-046009

(51) Int. Cl.
*G02F 1/1335* (2006.01)
(52) U.S. Cl. ........................................ 349/108; 349/106
(58) Field of Classification Search ........... 349/106–109
See application file for complete search history.

(56) References Cited

U.S. PATENT DOCUMENTS

| | | | |
|---|---|---|---|
| 6,143,211 A * | 11/2000 | Mathiowitz et al. | 264/4 |
| 6,630,274 B1 * | 10/2003 | Kiguchi et al. | 430/7 |
| 6,806,925 B2 * | 10/2004 | Ishii et al. | 349/106 |
| 6,870,584 B2 * | 3/2005 | Kawase et al. | 349/106 |
| 7,612,124 B2 * | 11/2009 | Polk et al. | 523/160 |
| 7,803,221 B2 * | 9/2010 | Magdassi et al. | 106/31.9 |
| 2001/0007733 A1 * | 7/2001 | Matsuyama et al. | 430/7 |
| 2002/0081503 A1 * | 6/2002 | Kawase et al. | 430/7 |
| 2003/0084820 A1 | 5/2003 | Okamoto et al. | |
| 2004/0038138 A1 * | 2/2004 | Kiguchi et al. | 430/7 |
| 2005/0248699 A1 * | 11/2005 | Li et al. | 349/106 |
| 2006/0076298 A1 | 4/2006 | Nakanishi et al. | |

FOREIGN PATENT DOCUMENTS

| | | |
|---|---|---|
| CN | 1321254 A | 11/2001 |
| CN | 1657981 A | 8/2005 |
| JP | 8-48890 A | 2/1996 |
| JP | 11-269401 A | 10/1999 |
| JP | 11-302553 A | 11/1999 |
| JP | 2000-239554 A | 9/2000 |
| JP | 2003-4938 A | 1/2003 |
| JP | 2003-89756 A | 3/2003 |
| JP | 2003-336001 A | 11/2003 |
| JP | 2004-91560 A | 3/2004 |
| JP | 2004-123853 A | 4/2004 |
| JP | 2004-211095 A | 7/2004 |
| JP | 2005-3861 A | 1/2005 |
| JP | 2005-234045 A | 9/2005 |

OTHER PUBLICATIONS

Chinese Office Action (with English Translation) issued on Apr. 19, 2010 in corresponding Chinese application No. 200780006449.7.
Japanese Office Action (with English Translation) issued on Feb. 22, 2011 in corresponding Japanese Application No. 2006-046009.

* cited by examiner

*Primary Examiner* — Rhonda S Peace
(74) *Attorney, Agent, or Firm* — Birch, Stewart, Kolasch & Birch, LLP

(57) ABSTRACT

An inkjet ink for color filter having fine pigment particles formed with a size in the order of nanometer dispersed in a medium containing a polymerizable monomer and/or a polymerizable oligomer, a color filter using the ink, methods of producing them, and a liquid crystal display device using them.

5 Claims, No Drawings

INKJET INK FOR COLOR FILTER, COLOR FILTER, METHODS OF PRODUCING THEM, AND LIQUID CRYSTAL DISPLAY DEVICE USING THEM

TECHNICAL FIELD

The present invention relates to a color filter, an inkjet ink for color filter, methods of producing them, and a liquid crystal display device using them. In particular, the present invention relates to a color filter that shows a high contrast and light stability, an inkjet ink for color filter, methods of producing them and a liquid crystal display device using them.

BACKGROUND ART

Recently, in accordance with improvements in image quality of liquid crystal display devices (LCD), employment of the LCD in place of the CRT (Braun tube) that is a popularized display is progressing in a wide variety of end uses. Accordingly, there is a demand for products that exhibit much higher quality image display performances in terms of a color reproduction range and brightness. Improvement in performances of the color filter is a key to responding to such the demand. This is because the color filter plays a role in coloring of display image of a LCD panel and the like, and therefore directly controls color properties of the LCD panel and remarkably influences the basic display properties.

As properties required for the color filter, high optical transmission, color purity, high contrast, lowered reflection, and the like can be mentioned. In particular, a low optical transmission and a low contrast cause a display screen to become dark owing to attenuation of light and causes discrimination between dark and bright to become unclear. Therefore, a high optical transmission is desired. Besides, it is also desired that a reproduction range of color that is obtained by combining R, G, and B is wide, and purity of each of thus-obtained color is high.

Under these circumstances, insofar as only improvement in transmittance of the color filter is required, this requirement can be fulfilled, e.g., by reduction in pigment particle size. However, the reduction in pigment particle size degrades the color purity and causes a narrow range of color reproduction. On the other hand, when a pigment concentration increases to widen a color reproduction range, a transmittance deteriorates. In other words, there is a tendency of these two requirements, i.e. the transmittance and the color reproduction range, to be contradictory to each other. Upon a further consideration of durability, it is absolutely impossible for the color filters currently in use to meet all of those requirements.

As described above, pigments have been used for color filters because each of them has a bright color tone, and high in coloring power and light resistance. For a practically important material among the pigments, in general, a fine particle form of pigments is frequently employed, i.e., the pigments are formed into fine-particles preventing them from aggregation so that bright their color tone and high coloring power can be obtained. In this regard, in many cases, when the fine pigment particles are reduced in size by a physical method such as salt milling, the dispersion of fine pigment particles results in a high viscosity liquid. Consequently, when the pigment dispersion liquid is prepared on an industrial scale, there arise the following problems: the pigment-dispersion liquid prepared can not be taken out of a dispersion machine, the dispersion liquid can not be transported through a pipeline, and further the dispersion liquid is solidified into a gel form during its storage.

To solve these problems and to obtain a pigment-dispersion liquid or colored photosensitive composition improved in fluidity and dispersibility, it has been attempted to modify the surface of an organic pigment (see, for example, JP-A-11-269401 ("JP-A" means unexamined published Japanese patent application) and JP-A-11-302553) and to use various dispersing agents (see, for example, JP-A-8-48890 and JP-A-2000-239554). Further, JP-A-2004-123853 and JP-A-2003-336001 describe reprecipitation of forming particles in which a sample dissolved in a good solvent is injected into a poor solvent.

When these pigments are used for the colored photosensitive composition, it is generally required that a layer formed by the colored photosensitive composition is extremely thin and that the layer shows a high coloring density even in such small thickness. Accordingly, e.g., an organic pigment is to be shaped in fine particles of highly and uniformly reduced in size and dispersed in an organic solvent. However, at present, there is no pigment and no color filter using the same satisfying those requirements.

As a further requirement for the color filter, there is a requirement for compatibility between cost reduction and contrast improvement. As one measure to reduction in cost, application of an inkjet method in forming RBG pixels is conceivable. On the other hand, as a contrast-improvement measure, size reduction of pigment particles is conceivable. However, as mentioned above, pigment particles currently in use cannot respond to those requirements. According to our further verification, pigment particles prepared by a traditional method, such as beads dispersion, cause deterioration in stability of ink used for forming pixels, and thereby ink-nozzle clogging occurs. Therefore, the ink cannot be manufactured with stability, so the ink productivity is lowered to result in a cost increase. In addition, unevenness of color in the color filter is occurred, and a decrease in color filter density is observed during the long-term use of a panel. Moreover, a color filter disclosed in JP-A-2003-33600 occurs dissolution of pixel materials and roughness of the color filter surface.

DISCLOSURE OF INVENTION

An object of the present invention is to provide an inkjet ink for color filter that can reduce a production cost of a color filter and has excellent display characteristics, a color filter, methods of producing them and a liquid crystal display device using them. In particular, an object of the present invention is to provide an inkjet ink for color filter and a color filter that hardly cause ink-nozzle clogging, ensure enhancement of contrast and reduction in color unevenness, and have excellent durability; and to provide methods of manufacturing them and a liquid crystal display device using them.

According to the present invention, there is provided the following means:

(1) An inkjet ink for color filter comprising fine pigment particles (pigment fine particles) formed with a size in the order of nanometer dispersed in a medium containing a polymerizable monomer and/or a polymerizable oligomer.
(2) The inkjet ink for color filter as described in the above item (1), wherein a pigment of the fine pigment particles is selected from the group consisting of C.I.P.R. 254, C.I.P.G. 36, C.I.P.Y. 138 and C.I.P.Y. 150.
(3) The inkjet ink for color filter as described in the above item (1) or (2), which has a viscosity of 5 to 25 mPa·s at the time of ink injection and a surface tension of 15 to 40 mN/m at the time of ink injection.

(4) A method of producing an inkjet ink for color filter as described in any one of the above items (1) to (3), comprising:

mixing a pigment solution of a pigment dissolved in a good solvent with a solvent that is compatible with the good solvent but is a poor solvent for the pigment, to form fine pigment particles of a size in the order of nanometer.

(5) A method of producing a color filter, comprising:

forming light-shielding barriers on a substrate so as to make a plurality of recesses partitioned by the barriers, injecting R (red) ink, G (green) ink and B (blue) ink into the respective recesses and depositing, in accordance with an inkjet method, so as to form colored resin layers of individual colors on the respective recesses;

wherein at least one the R ink, the G ink and the B ink contains fine pigment particles of a size in the order of nanometer.

(6) The method of producing a color filter as described in the above item (5), wherein the viscosity of the ink at the time of ink injection is 5 to 25 mPa·s and a surface tension of the ink at the time of ink injection is 15 to 40 mN/m.

(7) The method of producing a color filter as described in the above item (5) or (6), wherein the fine pigment particles are those prepared by mixing a pigment solution of a pigment dissolved in a good solvent with a solvent that is compatible with the good solvent but is a poor solvent for the pigment to form fine pigment particles of a size in the order of nanometer.

(8) The method of producing a color filter as described in any one of the above items (5) to (7), wherein the pigment is selected from the group consisting of C.I.P.R. 254, C.I.P.G. 36, C.I.P.Y. 138 and C.I.P.Y. 150.

(9) The method of producing a color filter as described in any one of the above items (5) to (8), comprising:

transferring a light-shielding resin layer from a photosensitive resin transfer material which has at least the light-shielding resin layer on a temporary support to the substrate, to form the light-shielding barriers on the substrate.

(10) A color filter prepared by using the inkjet ink for color filter as described in any one of the above items (1) to (3).

(11) A color filter prepared in accordance with the producing method as described in any one of the above items (5) to (9).

(12) A liquid crystal display device installed with the color filter as described in the above item (10) or (11).

The term "a fine pigment particle formed" used in the present invention refers to a fine pigment particle (a pigment fine particle) which is a particle formed by mixing a pigment solution prepared by dissolving a pigment in a good solvent with a solvent which is compatible with the good solvent, but a poor solvent for the pigment, and forming the pigment particle as a fine particle with a size in the order of nanometer.

Other and further features and advantages of the invention will appear more fully from the following description.

BEST MODE FOR CARRYING OUT INVENTION

Hereinafter, the present invention will be described in detail.

For the pigment for use in the inkjet ink for color filter of the present invention, there is no particular limitation. The pigment may be used alone or in combination with any other pigment such as a perylene, perynone, quinacridone, quinacridonequinone, anthraquinone, anthanthrone, benzimidazolone, disazo condensed, disazo, azo, indanthrone, phthalocyanine, triarylcarbonium, dioxazine, aminoanthraquinone, diketopyrrolopyrrole, thioindigo, isoindolin, isoindolinone, pyranthrone or isoviolanthrene-series pigment.

As examples of the pigment that can be used in the present invention, the dyes and pigments disclosed in paragraph Nos. [0038] to [0054] of JP-A-2005-17716; the pigments disclosed in paragraph Nos. [0068] to [0072] of JP-A-2004-361447; and the colorants disclosed in paragraph Nos. [0080] to [0088] of JP-A-2005-17521 can be preferably used.

In the inkjet ink for color filter of the present invention, it is preferable to use any one kind of pigment selected from C.I.P.R. 254, C.I.P.G. 36, C.I.P.Y. 138 or C.I.P.Y. 150, from the viewpoint of achieving a wide color reproduction range.

In the inkjet ink for color filter of the present invention, two or more pigments or solid solutions of pigments may be used in combination, or alternatively, a pigment may be used in combination with a common dye.

Examples of the organic dye include an azo dye, a cyanine dye, a merocyanine dye, and a coumarin dye. Examples of the polymer compound include polydiacetylene and polyimide.

The dye that can be used in the present invention is not particularly limited, and the conventionally used dyes for color filter can be used. Examples include the dyes disclosed in JP-A-64-90403, JP-A-64-91102, JP-A-1-94301, JP-A-6-11614, Japanese Patent No. 2592207, U.S. Pat. No. 4,808, 501, U.S. Pat. No. 5,667,920, U.S. Pat. No. 5,059,500, JP-A-5-333207, JP-A-6-35183, JP-A-6-51115, JP-A-6-194828, JP-A-8-211599, JP-A-4-249549, JP-A-10-123316, JP-A-11-302283, JP-A-7-286107, JP-A-2001-4823, JP-A-8-15522, JP-A-8-29771, JP-A-8-146215, JP-A-11-343437, JP-A-8-62416, JP-A-2002-14220, JP-A-2002-14221, JP-A-2002-14222, JP-A-2002-14223, JP-A-8-302224, JP-A-8-73758, JP-A-8-179120, JP-A-8-151531, and the like.

Various dyes different in chemical structure, such as pyrazole azo dyes, anilino azo dyes, triphenylmethane dyes, anthraquinone dyes, anthrapyridone dyes, benzylidene dyes, oxonol dyes, pyrazolotriazole azo dyes, pyridone azo dyes, cyanine dyes, phenothiazine dyes, pyrrolopyrazole azomethine dyes, xanthene dyes, phthalocyanine dyes, benzopyran dyes, and indigo dyes, may be used.

Further, in a case of a resist system in which development is performed in water or an alkaline solution, an acid dye and/or a derivative thereof may favorably be used from the viewpoint of completely removing the binder and/or the dye in a light-unirradiated portion by the development. Further, for example, a direct dye, a basic dye, a mordant dye, an acid mordant dye, an azoic dye, a disperse dye, an oil-soluble dye, a dye for food and/or derivatives thereof may also be usefully used.

The acid dye is not particularly limited, so long as it is a dye having an acidic group such as, for example, a sulfonic acid and a carboxylic acid. However, it is necessary to select the acid dye by taking into consideration all of required properties, such as solubility against an organic solvent or a developer, formability of a salt with a basic compound, light absorbance, an interaction with any one of other components in the composition, light resistance and heat resistance.

Specific examples of the above-described acid dye are described below, but the present invention is not restricted to these examples. The examples include: acid alizarin violet N; acid black 1, 2, 24 or 48; acid blue 1, 7, 9, 15, 18, 23, 25, 27, 29, 40, 45, 62, 70, 74, 80, 83, 86, 87, 90, 92, 103, 112, 113, 120, 129, 138, 147, 158, 171, 182, 192, 243 or 324:1; acid chrome violet K; acid Fuchsin; acid green 1, 3, 5, 9, 16, 25, 27, or 50; acid orange 6, 7, 8, 10, 12, 50, 51, 52, 56, 63, 74, or 95; acid red 1, 4, 8, 14, 17, 18, 26, 27, 29, 31, 34, 35, 37, 42, 44, 50, 51, 52, 57, 66, 73, 80, 87, 88, 91, 92, 94, 97, 103, 111, 114, 129, 133, 134, 138, 143, 145, 150, 151, 158, 176, 183, 198, 211, 215, 216, 217, 249, 252, 257, 260, 266, or 274; acid violet 6B, 7, 9, 17, or 19; acid yellow 1, 3, 7, 9, 11, 17, 23, 25, 29, 34, 36, 42, 54, 72, 73, 76, 79, 98, 99, 111, 112, 114, 116, 184, or 243; Food Yellow 3; and derivatives of these dyes.

In addition to the above dyes, acid dyes such as azo type, xanthene type and phthalocyanine type dyes are preferable, and acid dyes such as C.I. solvent Blue 44 and 38; C.I. Solvent Orange 45; Rhodamine B; Rhodamine 110; and derivatives thereof are preferably used.

Alternatively, an azo dye, a cyanine dye, a merocyanine dye or a coumarin dye may be used as the organic dye, and polydiacetylene, polyimide or the like as the polymer organic material.

Next, the good solvent used in forming a pigment into fine particles of nanometer sizes, that is nanometer-sized fine pigment particles, is described below. In this connection, it is necessary for a good solvent and a poor solvent chosen for combination to show a sufficient difference between their solubility for the organic pigment; and it is necessary to select proper solvents depending on the organic pigment to be used. However, any combination of solvents may be employed as long as they can carry out the above-described steps for forming fine pigment particles.

The good solvent is not particularly limited as long as it can dissolve the pigment to be used, and is compatible, or uniformly mixed, with the poor solvent to be used at the time of the production of the pigment fine particles. The solubility of the pigment in the good solvent in the present invention, is preferably 0.2 mass % or more, and more preferably 0.5 mass % or more. The solubility may be solubility in the case where the pigment is dissolved in the presence of an acid or an alkali. Compatibility, or uniform mixing property, between the good solvent and the poor solvent is such that the amount of the good solvent dissolved in the poor solvent is preferably 30 mass % or more, and more preferably 50 mass % or more.

Examples of the good solvents include aqueous solvents (e.g., water, aqueous hydrochloric acid solution, and aqueous sodium hydroxide solution), alcohol compound solvents, amide compound solvents, ketone compound solvents, ether compound solvents, aromatic compound solvents, carbon disulfide, aliphatic compound solvents, nitrile compound solvents, sulfoxide compound solvents, halogen compound solvents, ester compound solvents, ionic solvents, the mixed solvents thereof, and the like. Preferable good solvents include aqueous solvents, alcohol compound solvents, ester compound solvents, sulfoxide compound solvents, and amide compound solvents; aqueous solvents, sulfoxide compound solvents, and amide compounds solvents are more preferable; sulfoxide compound solvents and amide compounds solvents are particularly preferable.

Examples of the alcohol compound solvents include methanol, ethanol, isopropyl alcohol, n-propyl alcohol, 1-methoxy-2-propanol, and the like. Examples of the amide compound solvent include N,N-dimethylformamide, 1-methyl-2-pyrrolidone, 2-pyrrolidinone, 1,3-dimethyl-2-imidazolidinone, 2-pyrrolidinone, ϵ-caprolactam, formamide, N-methylformamide, acetamide, N-methylacetamide, N,N-dimethylacetamide, N-methylpropaneamide, and hexamethylphosphoric triamide. Examples of the ketone compound solvents include acetone, methylethylketone, methylisobutylketone, cyclohexanone, and the like. Examples of ether compound solvents include dimethylether, diethylether, tetrahydrofuran and the like. Examples of the aromatic compound solvents include benzene, toluene, and the like. Examples of the aliphatic compound solvents include hexane, and the like. Examples of the nitrile compound solvents include acetonitrile, and the like. Examples of the sulfoxide compound solvent include dimethyl sulfoxide, diethyl sulfoxide, hexamethylene sulfoxide, and sulfolane. Examples of the halogen compound solvents include dichloromethane, trichloroethylene, and the like. Examples of the ester compound solvents include ethyl acetate, ethyl lactate, 2-(1-methoxy) propyl acetate, and the like. Examples of the ionic solvents include a salt of 1-butyl-3-methylimidazolium and $PF_6^-$, and the like.

In addition, the concentration of the pigment solution prepared by dissolving the pigment in the good solvent is preferably in the range of the saturation concentration of the pigment with respect to the good solvent under a condition at the time of the dissolution to about one hundredth of the saturation concentration.

The condition under which the pigment solution is prepared is not particularly restricted, and can be selected from a range from a normal pressure condition to a subcritical or supercritical condition. The temperature at which the solution is prepared under normal pressure is preferably −10 to 150° C., more preferably −5 to 130° C., and particularly preferably 0 to 100° C.

In the present invention, at the time of producing the inkjet ink for color filter, the pigment contained in the pigment solution must be uniformly dissolved in the good solvent and it is also preferable that the pigment be dissolved under an acidic or alkaline solvent. In general, in the case of the pigment having in the molecule thereof a group dissociative under alkaline, the alkaline solvent is used, and in the case of the pigment having no group dissociative under alkaline but having in the molecule thereof many nitrogen atoms, to which protons easily adhere, the acidic solvent is used. For example, quinacridone-, diketopyrrolopyrrole-, and condensed disazo-series pigments are dissolved in the alkaline solvent, and a phthalocyanine-series pigment is dissolved in the acidic solvent.

Examples of a base that can be used in the case that the pigment is dissolved in an alkaline solvent, include inorganic bases, such as lithium hydroxide, sodium hydroxide, potassium hydroxide, calcium hydroxide, and barium hydroxide; and organic bases, such as trialkylamine, diazabicycloundecene (DBU), and metal alkoxides. Among these, inorganic bases are preferable.

The amount of the base to be used is not particularly limited, as long as the base in the amount can make the pigment be dissolved homogeneously. In the case of the inorganic base, the amount thereof is preferably from 1.0 to 30 mole equivalents, more preferably from 1.0 to 25 mole equivalents, and further preferably from 1.0 to 20 mole equivalents, to the pigment. In the case of the organic base, the amount thereof is preferably from 1.0 to 100 mole equivalents, more preferably from 5.0 to 100 mole equivalents, and further preferably from 20 to 100 mole equivalents, to the pigment.

Examples of an acid to be used in the case that the pigment is dissolved in the acidic solvent, include inorganic acids, such as sulfuric acid, hydrochloric acid, and phosphoric acid; and organic acids, such as acetic acid, trifluoroacetic acid, oxalic acid, methanesulfonic acid, and trifluoromethanesulfonic acid. Among these, the inorganic acids are preferable, and sulfuric acid is especially preferable.

The amount of the acid to be used is not particularly limited, as long as the acid in the amount can make the pigment be dissolved homogeneously. In many cases, the acid is used in a larger or more excessive amount than the base. Regardless the kind of the acid being an inorganic acid or an organic acid, the amount of the acid to be used is preferably from 3 to 500 mole equivalents, more preferably from 10 to 500 mole equivalents, and further preferably from 30 to 200 mole equivalents, to the pigment.

Next, the poor solvent for forming the pigment fine particles will be described.

The poor solvent is not particularly limited as long as it does not dissolve the pigment to be used, and is compatible, or uniformly mixed, with the good solvent for forming the pigment fine particles. The solubility of the pigment in the poor solvent in the present invention, is preferably 0.02 mass % or less, and more preferably 0.01 mass % or less. In addition, compatibility or uniform mixing property, between the poor solvent and the good solvent is as described above in the section of the good solvent.

Examples of the poor solvents include aqueous solvents (e.g., water, aqueous hydrochloric acid solution, and aqueous sodium hydroxide solution), alcohol compound solvents, ketone compound solvents, ether compound solvents, aromatic compound solvents, carbon disulfide, aliphatic compound solvents, nitrile compound solvents, halogen compound solvents, ester compound solvents, ionic solvents, the mixed solvents thereof, and the like. Preferable poor solvents include aqueous solvents, alcohol compound solvents, and ester compound solvents.

Examples of the alcohol compound solvents include methanol, ethanol, isopropyl alcohol, n-propyl alcohol, 1-methoxy-2-propanol, and the like. Examples of the ketone compound solvents include acetone, methylethylketone, methylisobutylketone, cyclohexanone, and the like. Examples of ether compound solvents include dimethylether, diethylether, tetrahydrofuran and the like. Examples of the aromatic compound solvents include benzene, toluene, and the like. Examples of the aliphatic compound solvents include hexane, and the like. Examples of the nitrile compound solvents include acetonitrile, and the like. Examples of the halogen compound solvents include dichloromethane, trichloroethylene, and the like. Examples of the ester compound solvents include ethyl acetate, ethyl lactate, 2-(1-methoxy) propyl acetate, and the like. Examples of the ionic solvents include a salt of 1-butyl-3-methylimidazolium and $PF_6^-$, and the like.

The above-described examples of the good solvent and those of the poor solvents overlap, but the identical solvent is not selected for both the good solvent and the poor solvent. Any solvents may be used in combination of them as long as an organic material to be used shows solubility in the good solvent sufficiently higher than that in the poor solvent. Specifically, the difference in solubility between them is preferably 0.2 mass % or more, and more preferably 0.5 mass % or more. There is no particular upper limit to the difference in solubility between the good solvent and the poor solvent. However, if ordinarily used organic materials are taken into consideration, it is practical that the upper limit is 50 mass % or less.

In the inkjet ink for color filter of the present invention, a binder may be added at the time of preparation of pigment fine particles. As the binder, preferred are alkali-soluble binders having an acidic group. The alkali-soluble binder having an acidic group may be added to both or either of the pigment solution and the poor solvent. Alternatively, it is also preferable to add a solution of the alkali-soluble binder having an acidic group, which is independently prepared, to the mixture of the pigment solution and the poor solvent. The alkali-soluble binder having an acid group for used at the time of producing the inkjet ink for color filter of the present invention is preferably a polymer having a polar group such as a carboxylic acid group or a carboxylate group at its side chain.

Examples of the polymer include a methacrylic acid copolymer, an acrylic acid copolymer, an itaconic acid copolymer, a crotonic acid copolymer, a maleic acid copolymer, and a partially esterified maleic acid copolymer described in, for example, JP-A-59-44615, JP-B-54-34327 ("JP-B" means examined Japanese patent publication), JP-B-58-12577, JP-B-54-25957, JP-A-59-53836, and JP-A-59-71048. The examples further include a cellulose derivative having a carboxylic acid group at its side chain. In addition to the foregoing, a product obtained by adding a cyclic acid anhydride to a polymer having a hydroxyl group can also be preferably used. In addition, particularly preferable examples of the binder include a copolymer of benzyl (meth)acrylate and (meth)acrylic acid and a multi-component copolymer of benzyl (meth)acrylate, (meth)acrylic acid, and any other monomer described in U.S. Pat. No. 4,139,391.

Further, for the purpose of improving crosslinking efficiency, a polymerizable group may be included in the side chain, and ultraviolet curing resins and thermosetting resins are also useful. Examples of the polymers containing polymerizable groups are given below, but not limited to these, provided that an alkali soluble group, such as —COOH group, —OH group, and an ammonium group, and a carbon-carbon unsaturated bond, are included therein. For example, a compound which is obtained by reacting a compound having an epoxy ring, which has a reactivity with —OH group, and a carbon-carbon unsaturated bond group, such as glycidyl acrylate, with a copolymer which is composed of a monomer having —OH group, such as 2-hydroxyethylacrylate, a monomer having —COOH group, such as methacrylic acid, and a monomer which is copolymerizable with the forgoing two types of monomers, such as an acrylic compound, a vinyl-series compound or the like, can be used. As the compound having a reactivity with —OH group, a compound having an acryloyl group, and an acid anhydride, and an isocyanate group, in place of the epoxy ring, can be used. Further, a reaction product which is obtained by reacting a saturated- or unsaturated-polybasic acid anhydride with a compound obtained by reacting a compound having an epoxy ring with an unsaturated carboxylic acid, such as acrylic acid, as disclosed in JP-A-6-102669 and JP-A-6-1938 can also be used. Examples of the compound which has both an alkali-soluble group, such as a —COOH group, and a carbon-carbon unsaturated group include DIANAL NR series (manufactured by Mitsubishi Rayon Co., Ltd.), PHOTOMER 6173 (—COOH group-containing polyurethane acrylic oligomer, manufactured by Diamond Shamrock Co., Ltd.), VISCOAT R-264 and KS RESIST 106 (manufactured by Osaka Organic Chemical Industry Ltd.), CYCLOMER P series and PRAXEL CF200 series (manufactured by Daicel Chemical Industries, Ltd.), EBECRYL 3800 (manufactured by Daicel-UCB Company Ltd.), and the like.

Further as the binder resin, organic macromolecule polymers having a water-soluble atomic group at a part of side chains of the polymer can be used. It is preferable that the binder resin is a linear organic macromolecule polymer miscible with a monomer and is soluble in an organic solvent and an alkaline solution (preferably one developable with a weak alkaline aqueous solution). Examples of such an alkali-soluble resin include polymers which have a carboxylic acid in a side chain, such as the methacrylic acid copolymer, the acrylic acid copolymer, the itaconic acid copolymer, the crotonic acid copolymer, the maleic acid copolymer, the partially esterified maleic acid copolymer, and the like as disclosed in, for example, JP-A-59-44615, JP-B-54-34327, JP-B-58-12577, JP-B-54-25957, JP-A-59-53836, and JP-A-59-71048. Similarly, acidic cellulose derivatives which have a carboxylic acid in a side chain are useful. In addition to these, a polymer having a hydroxyl group to which an acid anhydride is added, and the like are also useful as the aforementioned alkali-soluble resin. Specifically, benzyl(meth)acrylate/(meth)acrylic acid copolymers and multi-component copolymers of benzyl(meth)acrylate/(meth)acrylic acid/other monomer are particularly preferred among these polymers. As the above-described alkali-soluble resin, use can be made of a copolymer (hereinafter sometimes referred to as "copolymer A") composed of at least (i) at least one acid component monomer selected from maleic acid anhydride (MAA), acrylic acid (AA), methacrylic acid (MA), and fumaric acid (FA), and (ii) alkylpolyoxyethylene (meth)acrylate, and (iii) benzyl(meth)acrylate.

As the combination of the components in the above-described copolymer A, a composition ratio by mass of (i) an acid component monomer, (ii) alkylpolyoxyethylene (meth)acrylate ($Acr(EO)_n$:$CH_3(OC_2H_4)OCOC(CH_3)$=CHR), and (iii) benzyl(meth)acrylate (BzMA) is preferably 10-25/5-25/50-85, and more preferably 15-20/5-20/60-80. Besides, a weight average molecular weight (Mw) of the above-described copolymer in terms of polystyrene, according to GPC is preferably in the range of from 3,000 to 50,000, and more preferably from 5,000 to 30,000.

If the composition ratio by mass of (i) an acid component monomer is in the above-described range, alkali solubility and dissolution properties to solvents hardly decrease. Besides, if the composition ratio by mass of (ii) alkylpolyoxyethylene (meth)acrylate ($Acr(EO)_n$:$CH_3(OC_2H_4)_nOCOC(CH_3)$=CHR) is in the above-described range, a solution of the composition is easily spread onto a substrate, and also dispersibility of the coloring agent hardly decrease. Therefore, effects of the present invention can be effectively attained. If the composition ratio by mass of (iii) benzyl (meth)acrylate (BzMA) is in the above-described range, dispersion stability of the coloring agent, dispersibility of the coloring agent in a composition, and alkaline development suitability of the coating film hardly decrease.

The repeating number n of the polyoxyethylene $(EO)n$ in (ii) alkylpolyoxyethylene (meth)acrylate ($Acr(EO)_n$:$CH_3(OC_2H_4)_nOCOC(CH_3)$=CHR) is preferably in the range of from 2 to 15, more preferably from 2 to 10, and especially preferably from 4 to 10. If the repeating number n is in the above-described range, a development residue hardly generates after development with an alkaline developer. In addition, such the range can prevent generation of coating unevenness that is caused by reduction in fluidity of the composition as a coating solution. Consequently, said range can prevent deterioration in both uniformity of the coating film thickness and saving of liquid.

These binder polymers having a polar group may be used singly or in the form of a composition containing the binder polymer together with an ordinary film-forming polymer. The addition amount of the binder polymer is generally in the range of from 10 to 200 mass parts, preferably from 25 to 100 mass parts, based on 100 mass parts of the pigment.

In the case where the alkali-soluble binder having an acidic group is a polymer compound, the number of acid groups in the polymer compound is not particularly limited; but the number of repeating units each having an acid group(s) is preferably 5 to 100, and more preferably 10 to 100, when the number of repeating units in one molecule is set to 100. In addition, the polymerization ratio between (1) a repeating unit derived from a compound having a carboxyl group and (2) a repeating unit derived from a compound having a carboxylate group is preferably as follows: a ratio of the repeating unit (1) is 5 to 40 mol %, a ratio of the repeating unit (2) is 40 to 90 mol %, and a ratio of a repeating unit(s) except the repeating units (1) and (2) is 25 mol % or less. In addition, the molecular weight of the alkali-soluble binder polymer compound having an acid group is preferably 5,000 to 30,000, more preferably 7,000 to 15,000, and particularly preferably 5,000 to 80,000.

In the present invention, a dispersing agent is preferably added to both or one of the pigment solution and the poor solvent for producing the inkjet ink for color filter. It is also preferable to add a dispersant solution, which is independently prepared, at the time of the formation of the inkjet ink for color filter. The dispersing agent has a function (1) that the dispersing agent is rapidly adsorbed on the surface of the formed pigment, to form fine pigment particles, and (2) that these particles are prevented from aggregating again.

As the dispersing agent, use can be made of an anionic, cationic, amphoteric, nonionic or pigment-derivative-type, and low-molecular-weight or polymer dispersing agent. The molecular weight of the polymer dispersing agent for use may be any value, as long as the dispersing agent can be uniformly dissolved in a solution, but the polymer dispersing agent preferably has a molecular weight of 1,000 to 2,000,000, more preferably of 5,000 to 1,000,000, still more preferably of 10,000 to 500,000, and particularly preferably of 10,000 to 100,000. (The term "molecular weight" as used herein refers to the weight-average molecular weight measured by gel permeation chromatography (GPC) and calculated in terms of polystyrene. Polymer compounds are polydispersion-series compounds and do not always have a single molecular weight or a single particle mass. Thus, their measured molecular weights should be represented by a certain type of average molecular weight. The three main types of the average molecular weight are: 1) number average molecular weight Mn, 2) weight-average molecular weight Mw and 3) Z average molecular weight Mz; and the relationship Mn<Mw<Mz can be established.) Examples of the polymer dispersing agent include polyvinyl pyrrolidone, polyvinyl alcohol, polyvinyl methyl ether, polyethylene oxide, polyethylene glycol, polypropylene glycol, polyacrylamide, vinyl alcohol/vinyl acetate copolymer, partial-formal products of polyvinyl alcohol, partial-butyral products of polyvinyl alcohol, vinylpyrrolidone/vinyl acetate copolymer, polyethylene oxide/propylene oxide block copolymer, polyacrylic acid salts, polyvinyl sulfuric acid salts, poly(4-vinylpyridine) salts, polyamides, polyallylamine salts, condensed naphthalenesulfonic acid salts, cellulose derivatives, and starch derivatives. Besides, natural polymers can be used, examples of which include alginic acid salts, gelatin, albumin, casein, gum arabic, tragacanth gum, and ligninsulfonic acid salts. Above all, it is preferred to use polyvinyl pyrrolidone. These polymers may be used singly or in combination of two or more. These dispersing agents may be used singly or in combination of two or more thereof. The dispersing agents to be used when dispersing a pigment are described in detail in "Dispersion Stabilization of Pigment and Surface Treatment Technique/Evaluation" (published by Japan Association for International Chemical Information, on December 2001), pp. 29-46.

Examples of the anionic dispersing agent (anionic surfactant) include N-acyl-N-alkyltaurine salts, fatty acid salts, alkylsulfates, alkylbenzenesulfonates, alkylnaphthalenesulfonates, dialkylsulfosuccinates, alkylphosphates, naphthalenesulfonic acid/formalin condensates, and polyoxyethylenealkylsulfates. N-acyl-N-alkyltaurine salts are particularly preferable. As the N-acyl-N-alkyltaurine salts, those described in JP-A-3-273067 are preferable. These anionic dispersing agents may be used singly or in combination of two or more thereof.

Examples of the cationic dispersing agent (cationic surfactant) include quaternary ammonium salts, alkoxylated polyamines, aliphatic amine polyglycol ethers, aliphatic amines, diamines and polyamines derived from aliphatic amine and aliphatic alcohol; imidazolines derived from aliphatic acid, and salts of these cationic substances. These cationic dispersing agents may be used singly or in combination of two or more thereof.

The amphoteric dispersing agent is a dispersing agent having, in the molecule thereof, an anionic group moiety which the anionic dispersing agent has in the molecule and a cationic group moiety which the cationic dispersing agent has in the molecule.

Examples of the nonionic dispersing agents (nonionic surfactant) include polyoxyethylenealkyl ethers, polyoxyethylenealkylaryl ethers, polyoxyethylene fatty acid esters, sorbitan fatty acid esters, polyoxyethylenesorbitan fatty acid esters, polyoxyethylenealkylamines, and glycerin fatty acid esters.

Among these, polyoxyethylenealkylaryl ethers are preferable. These nonionic dispersing agents may be used singly or in combination of two or more thereof.

The pigment-dispersing agent is defined as a dispersing agent derived from an organic pigment as a parent material, and prepared by chemically modifying a structure of the parent material. Examples of the pigment-dispersing agent include sugar-containing pigment-dispersing agents, piperidyl-containing pigment-dispersing agents, naphthalene- or perylene-derivative pigment-dispersing agents, pigment-dispersing agents having a functional group linked through a methylene group to a pigment parent structure, pigment-dispersing agents (parent structure) chemically modified with a polymer, pigment-dispersing agents having a sulfonic acid group, pigment-dispersing agents having a sulfonamido group, pigment-dispersing agents having an ether group, and pigment-dispersing agents having a carboxylic acid group, carboxylic acid ester group or carboxamido group.

At the time of producing the inkjet ink for color filter of the present invention, as the above-described dispersing agent, it is preferred to use at least one kind of dispersing agent selected from compounds represented by formulae (I) or (III) set forth below; or a dispersing agent containing a graft copolymer.

[Chemical Formula 1]

A—N=N—X—Y   Formula (I)

In formula (I), A represents a component capable of forming an azo dye together with X—Y. The component A can be arbitrarily selected as long as the component is capable of fanning an azo dye upon coupling with a diazonium compound. Specific examples of the component A are shown below, but the present invention is not limited to these compounds.

[Chemical formula 2]

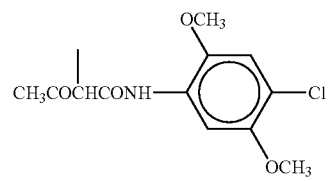
Formula 1-1

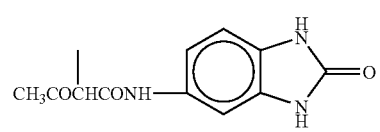
Formula 1-2

Formula 1-3

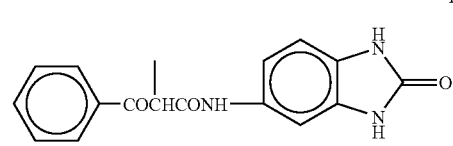
Formula 1-4

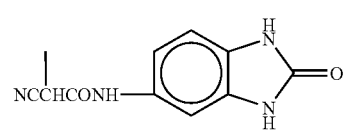
Formula 1-5

Formula 1-6

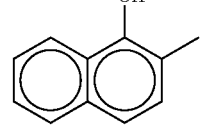
Formula 1-7

[Chemical formula 3]

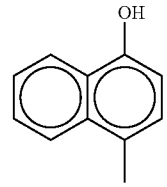
Formula 1-8

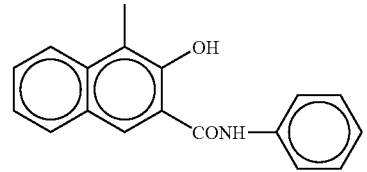
Formula 1-9

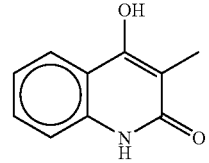
Formula 1-10

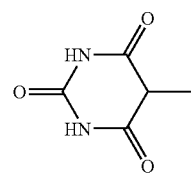

Formula 1-11

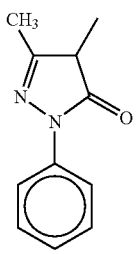

Formula 1-12

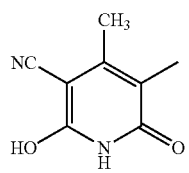

In formula (I), X represents a single bond, or a group selected from divalent connecting groups represented by structural formulae of formulae (i) to (v) set forth below.

[Chemical formula 4]

Formula (i)

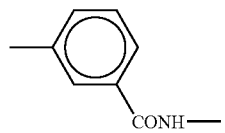

Formula (ii)

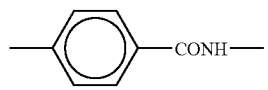

Formula (iii)

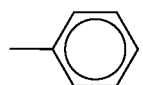

Formula (iv)

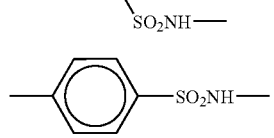

Formula (v)

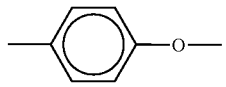

In formula (I), Y represents a group represented by the following formula (II).

[Chemical formula 5]

Formula (II)

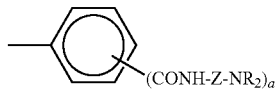

In formula (II), Z represents a lower alkylene group. In other words, Z can be expressed as $-(CH_2)_b-$ wherein b represents an integer of from 1 to 5, and preferably 2 or 3. In formula (II), $-NR_2$ represents a lower alkylamino group, or a nitrogen-containing, 5- or 6-membered, saturated heterocyclic group. In the case where said $-NR_2$ represents a lower alkylamino group, the lower alkylamino group can be expressed as $-N(C_nH_{2n+1})_2$ wherein n represents an integer of from 1 to 4, and preferably 1 or 2. In the case where said $-NR_2$ represents a nitrogen-containing, 5- or 6-membered, saturated heterocyclic group, the heterocyclic group is preferably any one of the heterocyclic groups shown by the following structural formulae.

[Chemical formula 6]

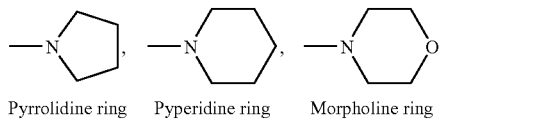

Pyrrolidine ring   Pyperidine ring   Morpholine ring

Each of Z and $-NR_2$ in the above-described formula (II) may optionally have a lower alkyl group or an alkoxy group, as a substituent. In the above-described formula (II), a represents 1 or 2, and preferably 2.

Specific examples of the compound represented by formula (I) are shown below, but the present invention is not limited to these examples.

[Chemical formula 7]

1.

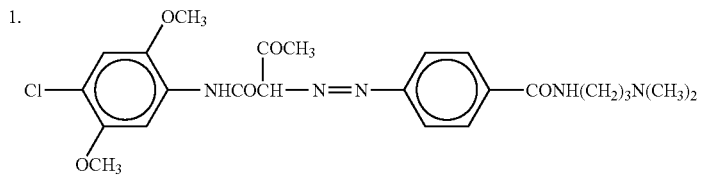

2.

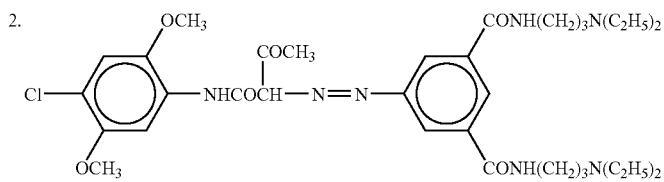

-continued
3. 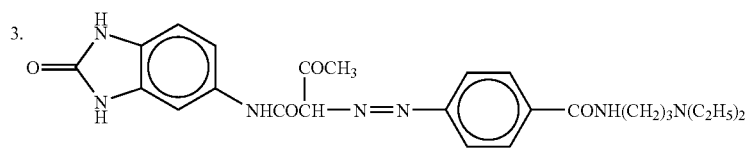
4. 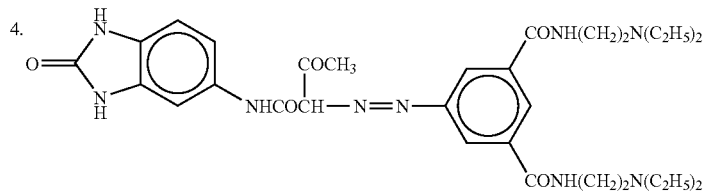
5. 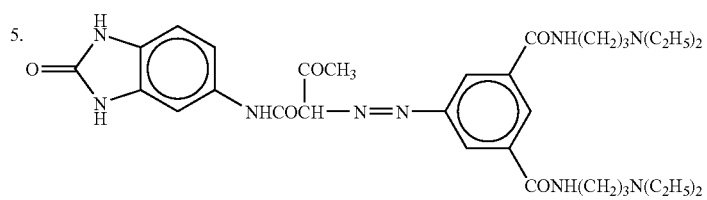
6. 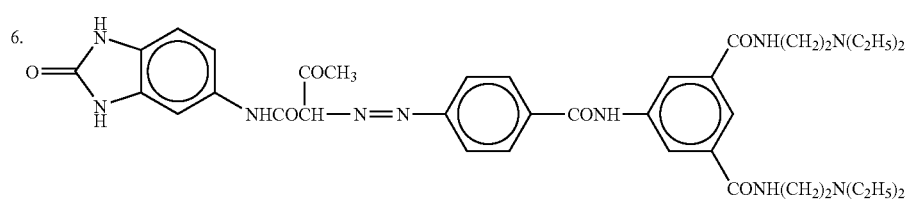
7. 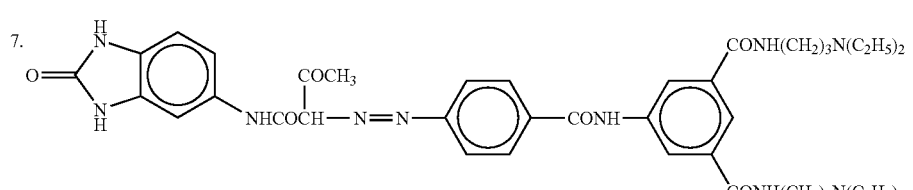
[Chemical formula 8]
8. 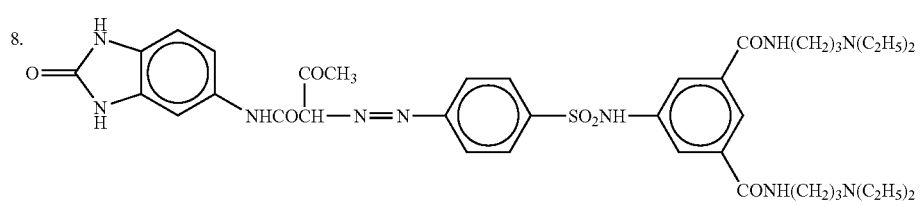
9. 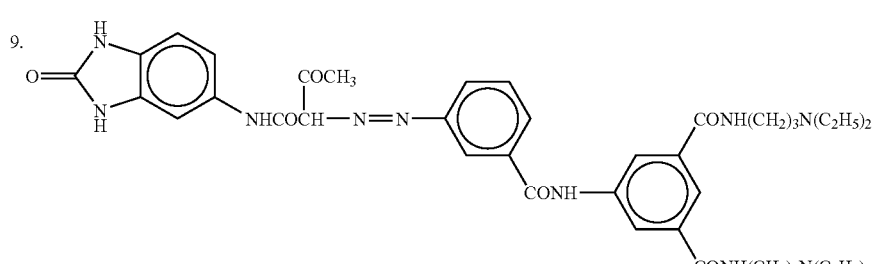
10. 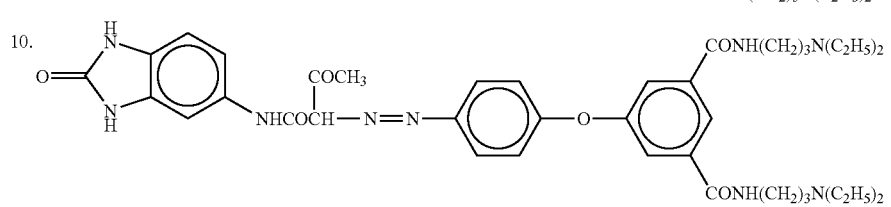

11. 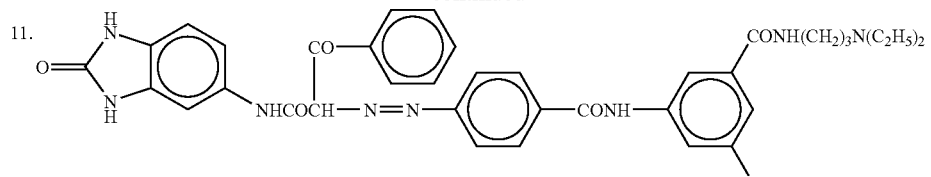
12. 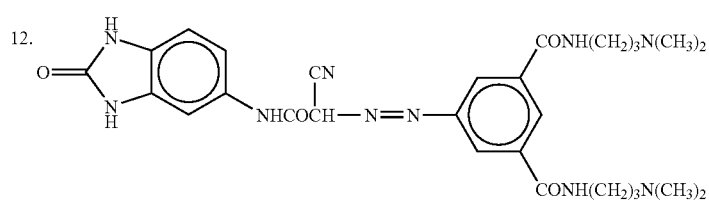
13. 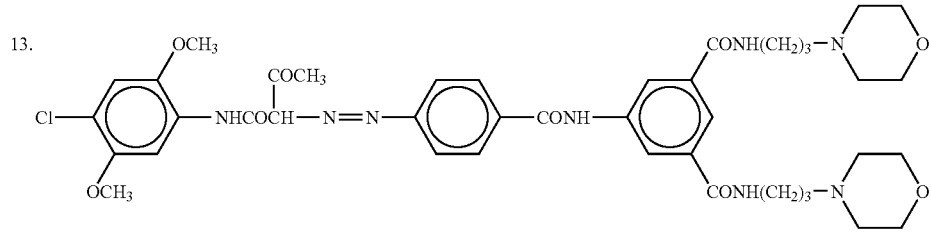
[Chemical formula 9]
14. 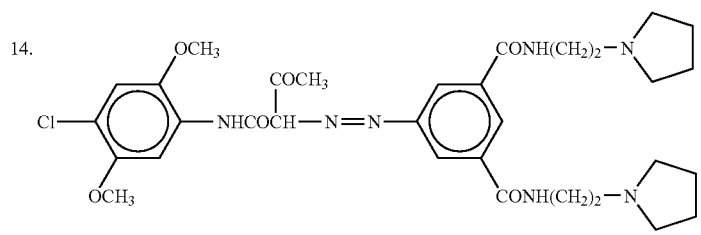
15. 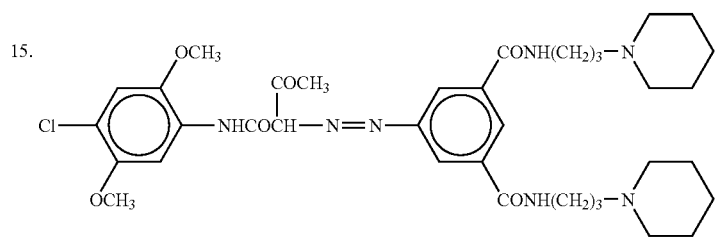
16. 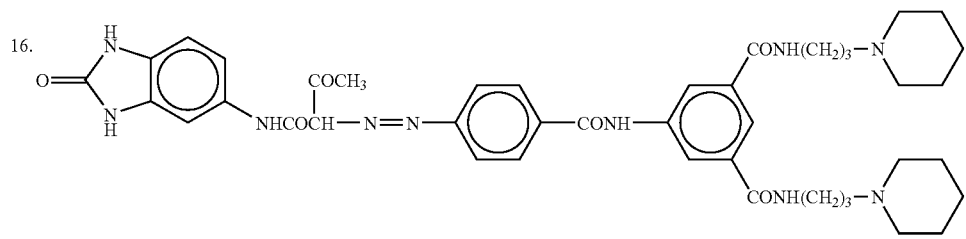
17. 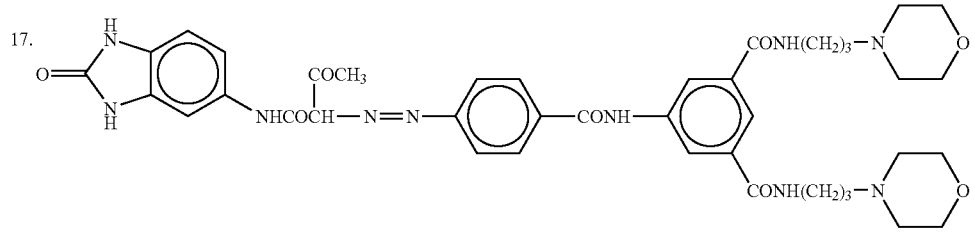

-continued
18. 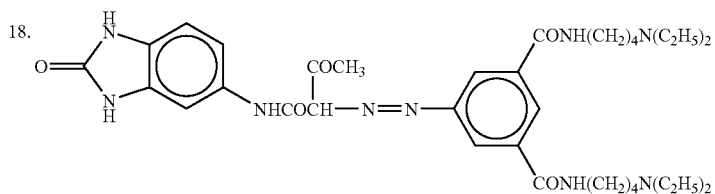
19. 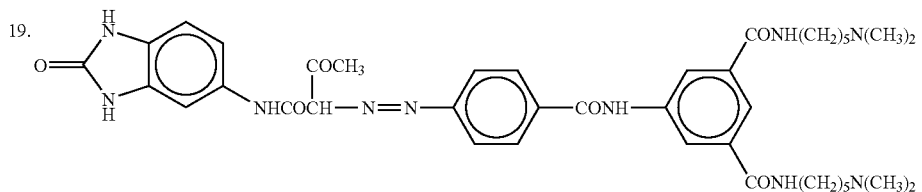
[Chemical formula 10]
20. 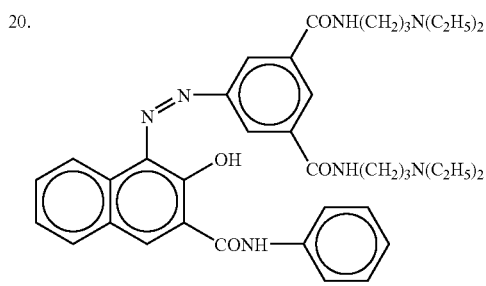
21. 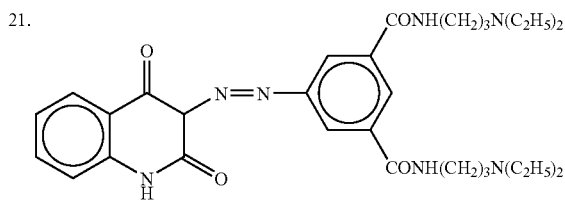
22. 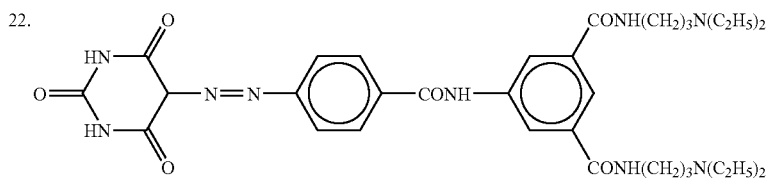

The compound represented by formula (I) can be synthesized by the method described in, for example, JP-A-2000-239554.

[Chemical formula 11]

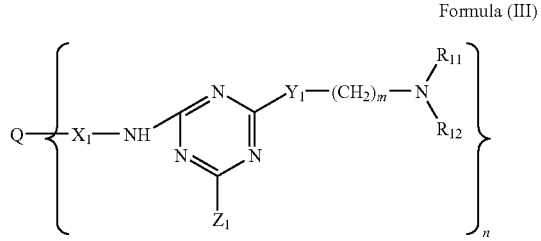

Formula (III)

In formula (III), Q represents a residue of an organic dye selected from anthraquinone-series dyes, azo-series dyes, phthalocyanine-series dyes, quinacridone-series dyes, dioxazine-series dyes, anthrapyrimidine-series dyes, anthanthrone-series dyes, indanthrone-series dyes, flavanthrone-series dyes, pyranthrone-series dyes, perynone-series dyes, perylene-series dyes, and thioindigo-series dyes. Among these organic dyes, preferred are azo-series dyes and dioxazine-series dyes. The azo-series dyes are more preferred.

$X_1$ represents —CONH—$Y_2$—, —$SO_2$NH—$Y_2$—, or —$CH_2$NHCOCH$_2$NH—$Y_2$—. $X_1$ is preferably —CO— or —CONH—$Y_2$—.

$Y_2$ represents an alkylene group or an arylene group, each of which may be substituted. Among these groups, preferred are a phenylene group, a toluylene group, and a hexylene group. The phenylene group is more preferred.

$R_{11}$ and $R_{12}$ each independently represent a substituted or unsubstituted alkyl group, alternatively, $R_{11}$ and $R_{12}$ represent groups that bond together to form a heterocyclic group which at least contains a nitrogen atom. Among these groups, preferred are a methyl group, an ethyl group, a propyl group, and a pyrrolidinyl group which contains a nitrogen atom. The ethyl group is more preferred.

$Y_1$ represents —NH— or —O—. $Z_1$ represents a hydroxyl group or a group represented by formula (IIIa). m represents an integer of 1 to 6, and preferably 2 or 3. n represents an integer of 1 to 4, and preferably 1 or 2.

[Chemical formula 12]

Formula (IIIa)

In formula (IIIa), $Y_3$ represents —NH— or —O—, and m, $R_{11}$, and $R_{12}$ have the same meanings as those in formula (III).

The compounds represented by formula (III) are specifically represented, for example, by the following formulae.

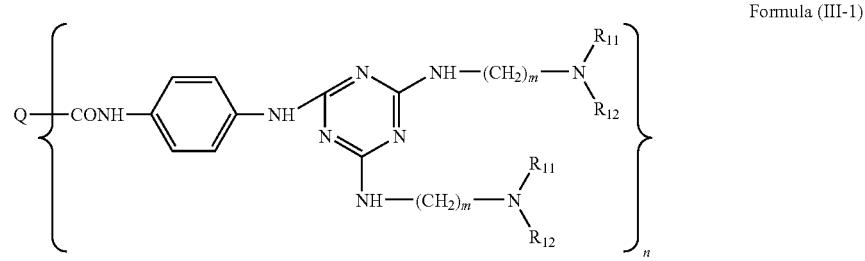

Formula (III-1)

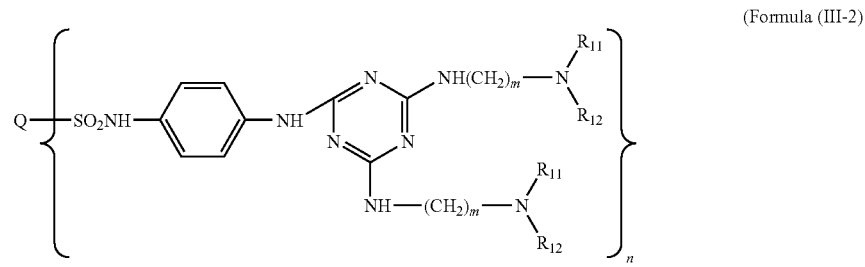

(Formula (III-2))

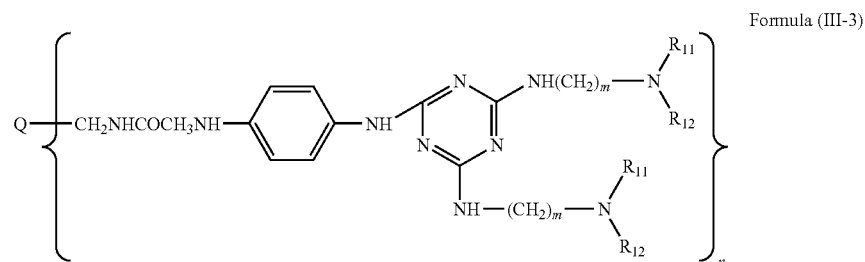

Formula (III-3)

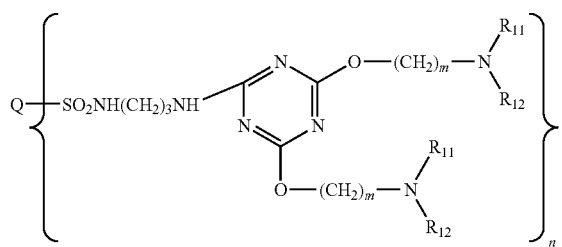
Formula (III-4)
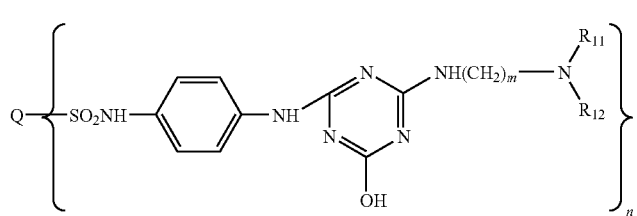
Formula (III-5)
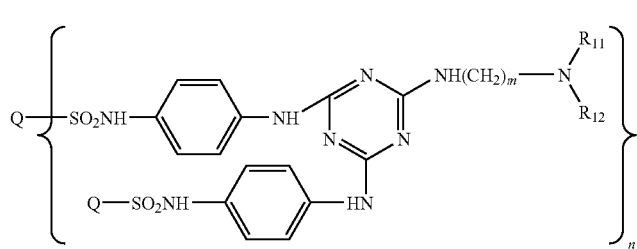
Formula (III-6)
In formulas (III-1) to (III-6), Q, m, n, $R_{11}$, and $R_{12}$ have the same meanings as those in formula (III). Specific examples of the compound represented by formula (III) are shown below, but the present invention is not meant to be limited to these.
[Chemical formula 14]
(a)
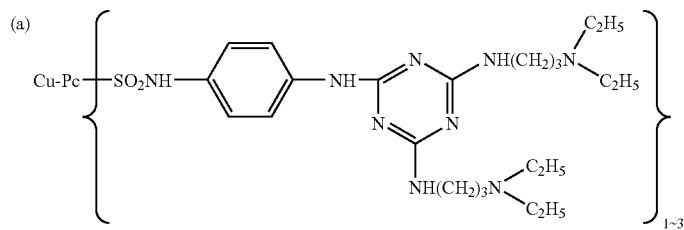
(b)
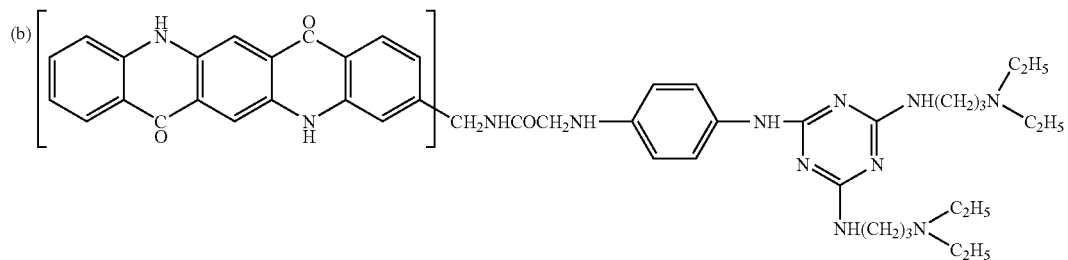

-continued
(c) 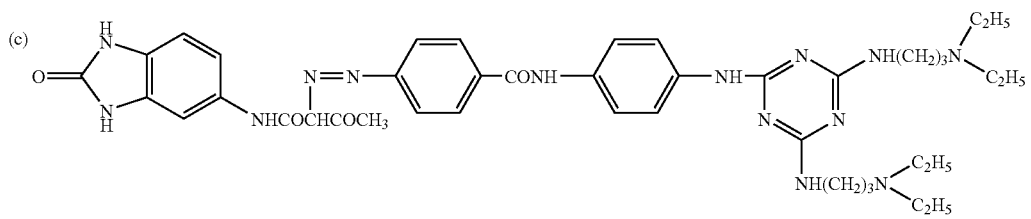
(d) 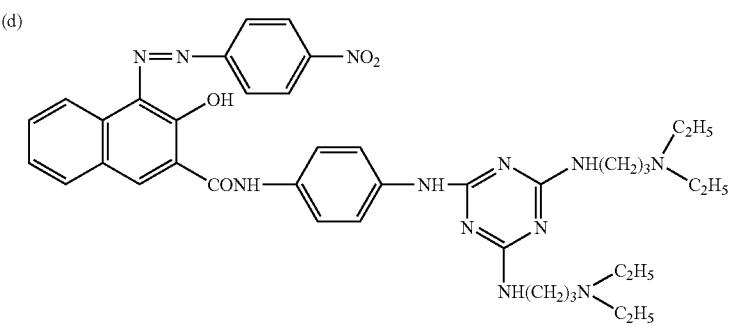
(e) 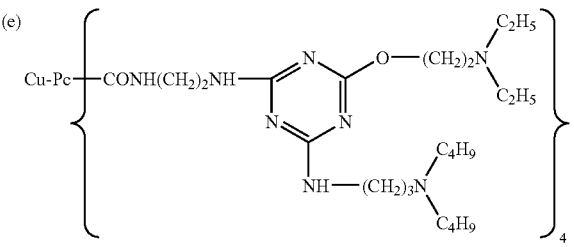
[Chemical formula 15]
(f) 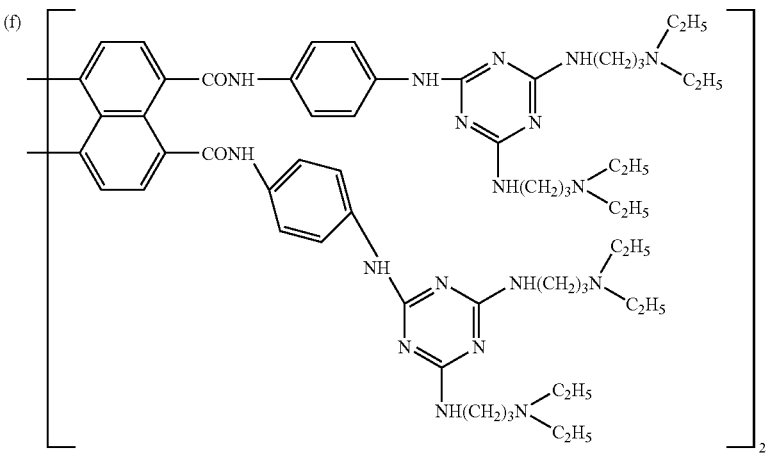

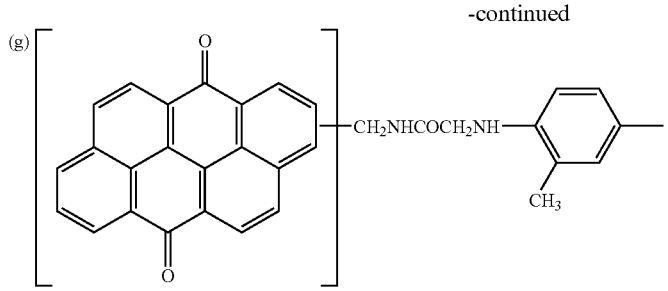

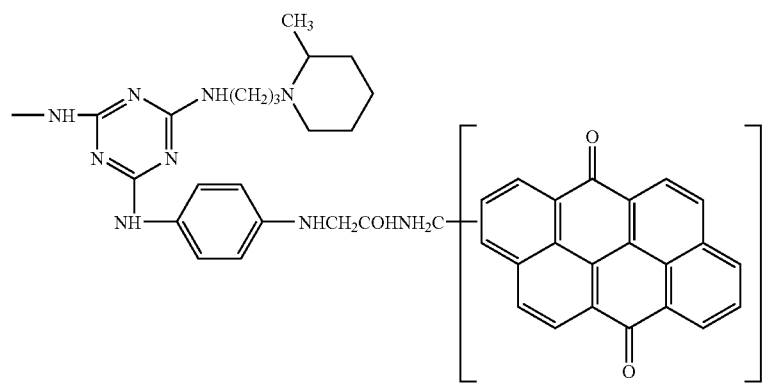

The compounds represented by formula (III) can be obtained, for example, by reaction of a dye compound with an intermediate which is obtained by a reaction of a halogenated triazine compound with an amine compound having $R_{11}$ and $R_{12}$ and an alcohol compound having $R_{11}$ and $R_{12}$. The disclosure of the specification of JP-B-5-72943 can be also referred for the synthesis of the compound.

The above-described graft copolymer at least has a nitrogen atom and an ether group, and also may contain other monomers as a copolymer unit. The nitrogen atom may be present in either the main chain or side chains of the graft copolymer.

The weight-average molecular weight (Mw) of the graft copolymer is preferably in a range of from 3,000 to 100,000, and more preferably in a range of from 5,000 to 50,000. If the weight-average molecular weight (Mw) is less than 3,000, it is difficult to prevent the pigment from aggregating, which sometimes results in elevation of viscosity. If the weight-average molecular weight is more than 100,000, solubility to an organic solvent becomes insufficient, which sometimes results in elevation of viscosity. The term "weight-average molecular weight" as used herein refers to the weight-average molecular weight measured by gel permeation chromatography (carrier: tetrahydrofuran) and calculated in terms of polystyrene.

It is preferred that the above-described graft copolymer contain as copolymer units, at least (i) a polymerizable oligomer having an ethylenically unsaturated double bond at a terminal, (ii) a nitrogen-containing monomer having a nitrogen atom and an ethylenically unsaturated double bond, and (iii) a polymerizable monomer having an ether group, and also, if necessary, contain (iv) other monomer(s).

The graft copolymer can be formed by polymerization reaction between the ethylenically-unsaturated double bond at the terminal of the polymerizable oligomer, the ethylenically-unsaturated double bond of the nitrogen-containing monomer, and the polymerizable monomer having an ether group.

The content of each of the copolymer units in the graft copolymer is as follows: the content of (i) the polymerizable oligomer is preferably in the range of from 15 to 98 mass %, more preferably from 25 to 90 mass %, the content of (ii) the nitrogen-containing monomer is preferably in the range of from 1 to 40 mass %, more preferably from 5 to 30 mass %, and the content of (iii) the polymerizable monomer having an ether group is preferably in the range of from 1 to 70 mass %, more preferably from 5 to 60 mass %.

If the content of the polymerizable oligomer is less than 15 mass %, a stereo-repulsion effect that should be attained by a pigment-dispersing agent is hardly obtained, and it sometimes becomes difficult to prevent the pigment from aggregating. If the content of the polymerizable oligomer is more than 98 mass %, the ratio of the nitrogen-containing monomer relatively decreases so that adsorption capacity to the pigment is lowered, and dispersibility sometimes becomes insufficient. If the content of the nitrogen-containing monomer is less than 1 mass %, dispersibility sometimes becomes insufficient owing to reduction of the adsorption capacity to the pigment. If the content of the nitrogen-containing monomer is more than 40 mass %, the ratio of the polymerizable oligomer relatively decreases so that a stereo-repulsion effect that should be attained by a pigment-dispersing agent is hardly obtained, and it sometimes becomes difficult to sufficiently prevent the pigment from aggregating. If the content of the polymerizable monomer having an ether group is less than 1 mass %, development suitability at the time of production of color filters and the like sometimes become insufficient. If the content of the polymerizable monomer having an ether group is more than 70 mass %, a capacity as a pigment-dispersing agent sometimes reduces.

The polymerizable oligomer (hereinafter, sometimes also referred to as "macro monomer") has a group having an ethylenically unsaturated double bond at one or both ends (terminals) thereof. Among the aforementioned polymerizable oligomers, it is preferred in the present invention that the oligomer has a group having an ethylenically unsaturated double bond at only one of the ends of the oligomer.

As the aforementioned oligomer, homopolymers or copolymers formed from at least one kind of monomer selected from such monomers as alkyl(meth)acrylates, hydroxyalkyl(meth)acrylates, styrene, acrylonitrile, vinyl acetate, and butadiene can be mentioned. Among these oligomers, preferred are homopolymers or copolymers of alkyl (meth)acrylates and polystyrene. In the present invention, these oligomers may further be substituted. There is no particular limitation to the substituent; a halogen atom can be mentioned as an example of the substituent.

Examples of the group having an ethylenically unsaturated double bond include a (meth)acryloyl group and a vinyl group. Among these groups, (meth)acryloyl group is especially preferred.

In the present invention, among these polymerizable oligomers, preferred are oligomers represented by formula (6) set forth below.

[Chemical formula 16]

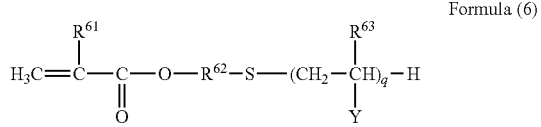

Formula (6)

In the above-described formula (6), $R^{61}$ and $R^{63}$ each represent a hydrogen atom or a methyl group. $R^{62}$ represents an alkylene group which has 1 to 8 carbon atoms and which may be substituted by an alcoholic hydroxyl group, and $R^{62}$ preferably represents an alkylene group having 2 to 4 carbon atoms. Y represents a phenyl group, a phenyl group having an alkyl group having 1 to 4 carbon atoms, or —COOR$^{64}$ ($R^{64}$ represents an alkyl group which has 1 to 6 carbon atoms and which may be substituted by an alcoholic hydroxyl group or halogen atom; a phenyl group, or an aralkyl group having 7 to 10 carbon atoms); and Y preferably represents a phenyl group or —COOR$^{64}$ ($R^{64}$ represents an alkyl group which has 1 to 4 carbon atoms and which may be substituted with an alcoholic hydroxyl group). q represents a number of from 20 to 200.

Specific examples of the polymerizable oligomer include poly-2-hydroxyethyl (meth)acrylate, polystyrene, poly-methyl(meth)acrylate, poly-n-butyl(meth)acrylate, poly-1-butyl (meth)acrylate, and copolymers of these monomers. Among these polymers, preferred are polymers having a (meth)acryloyl group bonded to one terminal of the molecule.

The polymerizable oligomer may be a commercially available product, or may be appropriately synthesized. Examples of the commercially available product include: a single-terminal-methacryloylated polystyrene oligomer (Mn=6,000, trade name: AS-6, manufactured by TOAGOSEI CO., LTD.); a single-terminal-methacryloylated polymethyl methacrylate oligomer (Mn=6,000, trade name: AA-6, manufactured by TOAGOSEI CO., LTD.); a single-terminal-methacryloylated poly-n-butyl acrylate oligomer (Mn=6,000, trade name: AB-6, manufactured by TOAGOSEI CO., LTD.); a single-terminal-methacryloylated polymethyl methacrylate/2-hydroxyethyl methacrylate oligomer (Mn=7,000, trade name: AA-714, manufactured by TOAGOSEI CO., LTD.); a single-terminal-methacryloylated polybutyl methacrylate/2-hydroxyethyl methacrylate oligomer (Mn=7,000, trade name: 707 S, manufactured by TOAGOSEI CO., LTD.); and a single-terminal-methacryloylated poly-2-ethylhexyl meth-acrylate/2-hydroxyethyl methacrylate oligomer (Mn=7,000, trade name: AY-707 S or AY-714 S, manufactured by TOAGOSEI CO., LTD.).

A preferable specific example of the polymerizable oligomer in the present invention is at least one kind of an oligomer selected from a polymer of an alkyl (meth)acrylate and a copolymer of an alkyl(meth)acrylate and polystyrene, with the oligomer having a number average molecular weight of 1,000 to 20,000, and with the oligomer having a (meth)acryloyl group at a terminal.

As the nitrogen-containing monomer, a preferable example is any one of the compounds represented by formula (2) set forth below.

[Chemical formula 17]

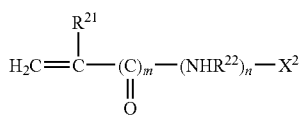

Formula (2)

In the above-described formula (2), $R^{21}$ represents a hydrogen atom or a methyl group. $R^{22}$ represents an alkylene group having 1 to 8 carbon atoms, preferably 1 to 6 carbon atoms, and especially preferably 2 to 3 carbon atoms.

$X^2$ represents —N(R$^{23}$)(R$^{24}$), —R$^{25}$N(R$^{26}$)(R$^{27}$), a pyrrolidino group, a pyrrolidyl group, a pyridyl group, a piperidino group, an imidazolyl group, a carbazoyl group, a triazolyl group, a tetrazolyl group or a morpholino group, wherein $R^{23}$ and $R^{24}$ each independently represent a hydrogen atom, an alkyl group having 1 to 6 carbon atoms, or a phenyl group. $R^{25}$ represents an alkylene group having 1 to 6 carbon atoms, and $R^{26}$ and $R^{27}$ each independently represent a hydrogen atom, an alkyl group having 1 to 6 carbon atoms, or a phenyl group.

Among these, —N(R$^{23}$)(R$^{24}$) and —R$^{15}$N(R$^{26}$)(R$^{27}$) are preferable. $R^{23}$ and $R^{24}$ of the —N(R$^{23}$)(R$^{24}$) are preferably a hydrogen atom, an alkyl group having 1 to 4 carbon atoms, or a phenyl group, and $R^{25}$ of the —R$^{25}$N(R$^{26}$)(R$^{27}$) is preferably an alkylene group having 2 to 6 carbon atoms, and $R^{26}$ and $R^{27}$ are preferably an alkyl group having 1 to 4 carbon atoms. Among the pyridyl group, a 4-pyridyl group, a 2-pyridyl group and the like are preferable. Among the piperidino group, a 1-piperidino group and the like are preferable. Among the pyrrolidyl group, a 2-pyrrolidyl group and the like are preferable. Among the morpholino group, a 4-morpholino group and the like are preferable. m and n each represent 1 or 0. The cases where m=1 and n=1 and where m=1 and n=0 are preferred. (The resultant monomers correspond to the monomers represented by formulae (3) and (4) set forth below.)

In the present invention, among the monomers represented by formula (2), preferred are at least one monomer selected from the monomers represented by any one of formulas (3) to (5) set forth below.

[Chemical formula 18]

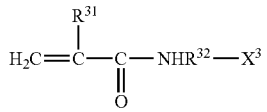

Formula (3)

In the above-described formula (3), $R^{31}$ has the same meaning as $R^{21}$. $R^{32}$ has the same meaning as $R^{22}$. $X^3$ has the same meaning as $X^2$.

[Chemical formula 19]

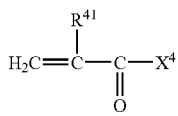

Formula (4)

In the above-described formula (4), $R^{41}$ has the same meaning as $R^{21}$. $X^4$ has the same meaning as $X^2$, and $X^4$ is preferably $-N(R^{43})(R^{44})$ (wherein $R^{43}$ and $R^{44}$ have the same meanings as $R^{23}$ and $R^{24}$), or $-R^{45}N(R^{46})(R^{47})$, (wherein $R^{45}$, $R^{46}$, and $R^{47}$ have the same meaning as $R^{25}$, $R^{26}$, and $R^{27}$).

[Chemical formula 20]

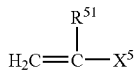

Formula (5)

In the above-described formula (5), $R^{51}$ has the same meaning as $R^{21}$. $X^5$ represents a pyrrolidino group, a pyrrolidyl group, a pyridyl group, a piperidino group, an imidazolyl group, a carbazoyl group, a triazolyl group, a tetrazolyl group or a morpholino group.

Preferable examples of the compound represented by the above-described formula (2) include (meth)acrylamides such as dimethyl(meth)acrylamide, diethyl(meth)acrylamide, diisopropyl(meth)acrylamide, di-n-butyl(meth)acrylamide, di-i-butyl(meth)acrylamide, morpholino(meth)acrylamide, piperidino(meth)acrylamide, N-methyl-2-pyrrolidyl(meth) acrylamide, and N,N-methylphenyl(meth)acrylamide; aminoalkyl(meth)acrylamides such as 2-(N,N-dimethylamino) ethyl(meth)acrylamide, 2-(N,N-diethylamino)ethyl(meth) acrylamide, 3-(N,N-diethylamino)propyl (meth)acrylamide, 3-(N,N-dimethylamino) propyl(meth)acrylamide, 1-(N,N-dimethylamino)-1,1-dimethylmethyl(meth)acrylamide, and 6-(N,N-diethylamino)hexyl(meth)acrylamide; and vinylpyridine, N-vinylimidazole, N-vinylcarbazole, N-vinyltriazole and vinyl tetrazole.

As the polymerizable monomer having an ether group, preferred are at least one monomer selected from the compounds represented by formula (1) set forth below.

[Chemical formula 21]

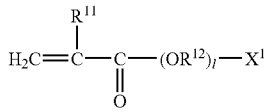

Formula (1)

In the above formula (1), $R^{11}$ represents a hydrogen atom or a methyl group. $R^{12}$ represents an alkylene group having 1 to 8 carbon atoms, preferably an alkylene group having 1 to 6 carbon atoms, and more preferably an alkylene group having 2 to 3 carbon atoms. $X^1$ represents $-OR^{13}$ or $-OCOR^{14}$. Wherein, $R^{13}$ represents a hydrogen atom, an alkyl group having 1 to 18 carbon atoms, a phenyl group, or a phenyl group substituted with an alkyl group having 1 to 18 carbon atoms. $R^{14}$ represents an alkyl group having 1 to 18 carbon atoms. Also, l denotes a number of 2 to 200, preferably 5 to 100, and particularly preferably 10 to 100.

No particular restriction is imposed on the polymerizable monomer having an ether group as long as the monomer is polymerizable and has an ether group, and the monomer can be appropriately selected from ordinary monomers. Examples thereof include polyethylene glycol mono(meth) acrylate, polypropylene glycol mono(meth)acrylate, polyethylene glycol polypropylene glycol mono(meth)acrylate, and polytetramethylene glycol monomethacrylate. These materials may be commercially available products or may be those synthesized properly. Examples of these commercially available products include methoxypolyethylene glycol methacrylate (trade name: NK ESTER M-40G, M-90G, and M-2300 (manufactured by Toagosei Co., Ltd.); trade name: BLENMER-PME-100, PME-200, PME-400, PME-1000, PME-2000, and PME-4000 (manufactured by Nippon Oil & Fats Co., Ltd.)), polyethylene glycol monomethacrylate (trade name: BLENMER-PE-90, PE-200, and PE-350 (manufactured by Nippon Oil & Fats Co., Ltd.)); polypropylene glycol monomethacrylate (trade name: BLENMER-PP-500, PP-800, and PP-1000 (manufactured by Nippon Oil & Fats Co., Ltd.)), polyethylene glycol polypropylene glycol monomethacrylate (trade name: BLENMER-70PEP-370B (manufactured by Nippon Oil & Fats Co., Ltd.)), polyethylene glycol polytetramethylene glycol monomethacrylate (trade name: BLENMER-55PET-800 (manufactured by Nippon Oil & Fats Co., Ltd.)), and polypropylene glycol polytetramethylene glycol monomethacrylate (trade name: BLENMER-NHK-5050 (manufactured by Nippon Oil & Fats Co., Ltd.)).

The above-described graft copolymers may contain, additionally, the above-described other monomer(s) as a copolymer unit. The other monomers are not particularly limited, and they can be properly selected in accordance with purposes. Examples of the other monomers include aromatic vinyl compounds (e.g., styrene, α-methyl styrene, vinyl toluene), alkyl(meth)acrylates (e.g., methyl(meth)acrylate, ethyl (meth)acrylate, n-butyl(meth)acrylate, i-butyl(meth)acrylate), alkylaryl(meth)acrylates (e.g., benzyl(meth)acrylate), glycidyl(meth)acrylate, vinyl carboxylates (e.g., vinyl acetate, vinyl propionate), vinyl cyanides (e.g., (meth)acrylonitrile, α-chloro acrylonitrile), aliphatic conjugate dienes (e.g., 1,3-butadiene, isoprene), and (meth)acrylic acid. Among these monomers, preferred are unsaturated carboxylic acids, alkyl(meth)acrylates, alkylaryl(meth)acrylates, and vinyl carboxylates.

The content of the other monomers in the above-described graft copolymers is, for example, preferably in the range of from 5 to 70 mass %. If the content is less than 5 mass %, it sometimes becomes difficult to control physical properties of the coating film. If the content is more than 70 mass %, it sometimes becomes difficult for the graft copolymer to fully exhibit its capacity as a pigment-dispersing agent.

Preferable specific examples of the graft copolymers include:

(1) A copolymer of N-vinylimidazole/polyethylene glycol mono(meth)acrylate/terminal-methacryloylated polymethyl(meth)acrylate, (2) A copolymer of N-vinylcarbazole/ polyethylene glycol mono(meth)acrylate/terminal-methacryloylated polymethyl(meth)acrylate, (3) A copolymer of N-vinyltriazole/polyethylene glycol mono(meth)acrylate/terminal-methacryloylated polymethyl(meth)acrylate, (4) A copolymer of N-vinylimidazole/polyethylene glycol mono(meth)acrylate/terminal-methacryloylated polystyrene, (5) A copolymer of N-vinylcarbazole/polyethylene glycol mono(meth)acrylate/terminal-methacryloylated polystyrene, (6) A copolymer of N-vinylimidazole/polyethylene glycol mono(meth)acrylate/methyl (meth)acrylate/terminal-methacryloylated polystyrene, (7) A copolymer of N-vinylimidazole/polyethylene glycol mono(meth)acrylate/benzyl (meth)acrylate/terminal-methacryloylated polystyrene, (8) A copolymer of vinylpyridine/polyethylene glycol mono (meth)acrylate/ terminal-methacryloylated polymethyl (meth)acrylate, (9) A copolymer of N,N-dimethyl-2-piperidylethyl acrylate/polyethylene glycol mono(meth) acrylate/terminal-methacryloylated polymethyl(meth) acrylate, (10) A copolymer of 4-morpholinoethyl acrylate/ polyethylene glycol mono(meth)acrylate/terminal-methacryloylated polymethyl (meth)acrylate, (11) A copolymer of 3-(N, N-dimethylamino)propylacrylamide/ polyethyleneglycol mono(meth)acrylate/terminal-methacryloylated polymethyl(meth)acrylate, (12) A copolymer of 3-(N, N-dimethylamino)propylacrylamide/polyethyleneglycol mono(meth)acrylate/terminal-methacryloylated polystyrene,

(13) A copolymer of 3-(N,N-dimethylamino)propylacrylamide/polyethyleneglycol mono(meth)acrylate/methyl (meth)acrylate/terminal-methacryloylated polystyrene, (14) A copolymer of 3-(N,N-dimethylamino)propylacrylamide/polyethyleneglycol mono(meth)acrylate/a copolymer of terminal-methacryloylated methyl(meth)acrylate and 2-hydroxyethylmethacrylate, (15) A copolymer of 3-(N, N-dimethylamino)propylacrylamide/polyethylene glycol mono(meth)acrylate/a copolymer of terminal-methacryloylated methyl methacrylate and 2-hydroxyethyl methacrylate, (16) A copolymer of 3-(N,N-dimethylamino)propylacrylamide/polyethylene glycol mono (meth)acrylate/a copolymer of terminal-methacryloylated methyl methacrylate and 2-hydroxyethyl methacrylate,

(17) A copolymer of 3-(N,N-dimethylamino)propylacrylamide/polypropyleneglycol mono(meth)acrylate/terminal-methacryloylated polymethyl(meth)acrylate, (18) A copolymer of 3-(N,N-dimethylamino)propylacrylamide/ polyethyleneglycol polypropyleneglycol mono(meth) acrylate/terminal-methacryloylated polymethyl (meth) acrylate, (19) A copolymer of 3-(N, N-dimethylamino) propylacrylamide/polyethyleneglycol polytetramethyleneglycol mono (meth)acrylate/terminal-methacryloylated polymethyl(meth)acrylate, and (20) A copolymer of 3-(N,N-dimethylamino)propylacrylamide/ polypropyleneglycol polytetramethyleneglycol mono (meth)acrylate/terminal-methacryloylated polymethyl (meth)acrylate.

Among these copolymers, preferred are (11), (14), and (18). More preferred is a compound represented by formula (IV) set forth below.

The above-described graft copolymers can be obtained by subjecting components that constitute units of the above-described copolymers to, for example, radical polymerization in a solvent. At the time of the radical polymerization, a radical polymerization initiator may be used. Further, there can be used a chain transfer agent (e.g., 2-mercapto ethanol and dodecyl mercaptan). A pigment dispersing agent can be also prepared with reference to descriptions of JP-B-5-72943.

In order to further improve uniform dispersibility and preservability of the pigment, the content of the dispersing agent is preferably in the range of from 0.1 to 1000 mass parts, more preferably from 1 to 500 mass parts, and furthermore preferably from 5 to 20 mass parts, based on 100 mass parts of the pigment. When the content is less than 0.1 mass parts, it sometimes causes no improvement in dispersion stability of the pigment fine particles.

The fine pigment particles formed that can be used in the inkjet ink for color filter of the present invention is preferably pigment fine particles obtained, as mentioned above, by mixing at least a pigment solution and a poor solvent to form pigments as fine particles. The temperature condition at the time of forming the fine particles has no particular limitations, and can be selected from a range from a normal pressure condition to a subcritical or supercritical condition. The temperature under normal pressure condition is preferably from −30° C. to 100° C., more preferably from −10° C. to 60° C., and particularly preferably from 0° C. to 30° C. Although the pressure condition at the time of forming the fine particles also has no particular limitations, pressure may be added for the purpose of enhancing the yield. In this case, it is preferable to apply pressure of, for example, $10^5$ to $10^8$ Pa, though a preferable pressure varies depending on the kind of the pigment and the like.

The method of mixing a pigment solution and a poor solvent is not particularly limited. At the time of mixing the pigment solution and the poor solvent, it is preferable that either of them is added to the other in a state of being stirred. It is more preferred that mixing is conducted by adding the pigment solution to the poor solvent. It is particularly preferred that mixing is conducted by adding the pigment solution to the poor solvent in a state of being stirred. A pump or the like may be or may not be used for adding. As the adding method, a method of adding a liquid inside the other liquid or a method of adding a liquid outside the other liquid may be used; a method of adding a liquid inside the other liquid is preferable. In the method of adding a liquid inside the other liquid, the addition may be carried out via one inlet, or two or more inlets may be used for the addition. The diameter of the inlet for the addition is preferably 20 mm or less, and more preferably 10 mm or less.

[Chemical formula 22]

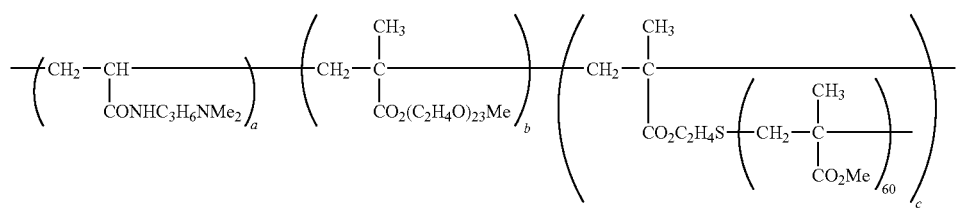

Formula (IV)

a: b: c = 15: 20: 65 (mass ratio)
(Me represents a methyl group.)

The stirring rate is preferably 100 to 10,000 rpm, more preferably 150 to 8,000 rpm, and particularly preferably 200 to 6,000 rpm.

The mixing ratio of the pigment solution and the poor solvent (a ratio of good solvent/poor solvent) is preferably in a range of from 1/50 to 2/3, more preferably from 1/40 to 1/2, and especially preferably from 1/20 to 3/8, in terms of volume ratio.

The pigment concentration in the dispersion liquid containing formed pigment fine particles is not particularly limited, as long as pigment fine particles can be dispersed, but the amount of the nanoparticles is preferably 10 to 40,000 mg, more preferably 20 to 30,000 mg, and particularly preferably 50 to 25,000 mg, per 1,000 ml of the dispersion solvent.

As to the particle diameter of pigment fine particles, an average scale of a group can be digitalized by several measurement methods. There are frequently-used parameters such as mode diameter indicating the maximum value of distribution, median diameter corresponding to the median value in the integral frequency distribution curve, and various average diameters (number-averaged diameter, length-averaged diameter, area-averaged diameter, weight-averaged diameter, volume-averaged diameter, or the like), and the like. In the present specification, the particle diameter means a number-averaged diameter, unless otherwise particularly specified. The particle diameter of the pigment fine particles (primary particles) is preferably 1 μm or less (in a state of, e.g., crystal or aggregate of such a size), more preferably 1 to 200 nm, further preferably 2 to 100 nm, and particularly preferably 5 to 80 nm.

Further, in the present invention, a ratio (Mv/Mn) of volume-averaged diameter (Mv) to number-averaged diameter (Mn) is used as the indicator of the monodispersity of particles (degree of the uniformity in particle size), unless otherwise particularly specified. The mono dispersity, the ratio Mv/Mn, of the pigment fine particles (primary particles) is preferably 1.0 to 2.0, more preferably 1.0 to 1.8, and particularly preferably 1.0 to 1.5.

At the time of forming inkjet ink for color filter of the present invention, the pigment dispersion may be subjected to desalting and condensation, whereby a pigment dispersion suitable for a color filter coating liquid or for inkjet ink can be produced on an industrial scale.

A method of condensing the dispersion liquid will be described below.

The condensation method is not particularly restricted as long as the pigment liquid can be concentrated by the method. Examples of a preferable condensation method include: a method involving adding and mixing an extraction solvent to and with a pigment dispersion, condensing and extracting the pigment fine particles to the extraction solvent phase, and filtering the concentrated extract liquid through a filter or the like, to provide a concentrated pigment liquid; a method involving sedimenting the pigment fine particles by centrifugal separation for condensation; a method involving performing desalting and condensation by ultrafiltration; a method involving sublimating a solvent by vacuum freeze-drying for condensation; and a method involving drying a solvent under heat or reduced pressure for condensation. Alternatively, a combination of two or more of these methods is extremely preferably employed.

The pigment fine particle concentration after condensation is preferably 1 to 100 mass %, more preferably 5 to 100 mass %, and particularly preferably 10 to 100 mass %.

Hereinafter, the method of condensing and extracting the pigment fine particles will be explained. The extraction solvent for use in the process of concentrating and extracting is not particularly limited, but it is preferably a solvent that is substantially incompatible (immiscible) with the dispersion solvent of the pigment dispersion (e.g., aqueous solvent) (in the present specification, the term "substantially incompatible" means that the compatibility is low, and the amount of the extraction solvent soluble in the dispersion solvent is preferably 50 mass % or less, and more preferably 30 mass % or less), and that forms an interface after the extraction solvent is mixed with the dispersion solvent and left still. In addition, the extraction solvent is preferably a solvent that causes weak aggregation to such a degree that the pigment fine particles can be redispersed in the extraction solvent. Herein, "weak, redispersible aggregation" means that aggregates can be redispersed without applying high shearing force such as by milling or high-speed agitation. Such a state is preferable, because it is possible to prevent strong aggregation that may change the particle size, and to swell the desirable pigment fine particles with the extraction solvent, besides the dispersion solvent such as water can be easily and rapidly removed by filter-filtration. As the extraction solvent, ester compound solvents, alcohol compound solvents, aromatic compound solvents, and aliphatic compound solvents are preferable; ester compound solvents, aromatic compound solvents, and aliphatic compound solvents are more preferable; and ester compound solvents are particularly preferable.

Examples of the ester compound solvent include 2-(1-methoxy)propyl acetate, ethyl acetate, ethyl lactate, and the like. Examples of the alcohol compound solvent include n-butanol, isobutanol, and the like. Examples of the aromatic compound solvent include benzene, toluene, xylene, and the like. Examples of the aliphatic compound solvent include n-hexane, cyclohexane, and the like. The extraction solvent may be a pure solvent of one of the preferable solvents above, while it may be a mixed solvent of multiple solvents.

The amount of the extraction solvent is not particularly limited, as long as the solvent can extract the pigment fine particles, but the amount of the extraction solvent is preferably smaller than the amount of the pigment dispersion, considering extraction for concentration. If expressed by volume ratio, the amount of the extraction solvent to be added is preferably in the range of 1 to 100, more preferably in the range of 10 to 90, and particularly preferably in the range of 20 to 80, with respect to 100 of the pigment dispersion. A too-large amount may results in elongation of the period for concentration, while a too-small amount may cause insufficient extraction and residual nanoparticles in the dispersion solvent.

After addition of the extraction solvent, it is preferably agitated well for sufficient mutual contact with the dispersion. Any usual method may be used for agitation and mixing. The temperature during addition and mixing of the extraction solvent is not particularly limited, but preferably 1 to 100° C. and more preferably 5 to 60° C. Any apparatus may be used for addition and mixing of the extraction solvent as long as it can suitably carry out each step. For example, a separatory funnel-like apparatus may be used.

As the method for ultrafiltration, methods used for desalting and concentrating silver halide emulsion can be used. Examples are those methods described in Research Disclosure, No. 10208 (1972), No. 13 122 (1975), No. 16 351 (1977) etc. While pressure difference and flow rate, which are important as the operational conditions, can be selected by referring to the characteristic curves mentioned in Haruhiko Oya, "Make Riyo Gijutsu Handbook (Membrane Utilization Technique Handbook)", published by Saiwai Shobo (1978), p. 275, it is necessary to find out optimum conditions for treating a pigment dispersion of interest in order to suppress aggregation of particles. As a method for supplementing the solvent lost due to passage through the membrane, there are the constant volume method where the solvent is continuously supplemented and the batch method where the solvent is intermittently added. The constant volume method is preferred in the present invention because of its relatively shorter desalting treatment time. As the solvent to be supplemented as described above, pure water obtained by ion exchange or distillation is generally used. A dispersing agent or a poor solvent for dispersing agent may be mixed in the pure water. Alternatively, the dispersing agent or the poor solvent for dispersing agent can also be directly added to the pigment dispersion.

As an ultrafiltration membrane, modules of plate type, spiral type, cylinder type, hollow yarn type, hollow fiber type and so forth, in which a membrane is already incorporated, are commercially available from Asahi Chemical Industry Co., Ltd., Daicel Chemical Industries, Ltd., Toray Industries, Inc., NITTO DENKO CORP. and so forth. In view of the total membrane area and washability, those of hollow yarn type and spiral type are preferred. The fractional molecular weight, which is an index of a threshold for substances that can permeate a membrane, must be determined based on the molecular weight of the used dispersing agent. In the present invention, those having a fractional molecular weight of 5,000 to 50,000, more preferably 5,000 to 15,000, are preferably used.

To separate a concentrated extract liquid from a dispersion solvent of the pigment dispersion, filtration by using a filter is preferable. As the apparatus for filter-filtration, for example, an apparatus such as a high-pressure filtration apparatus can be used. Preferable filters include nanofilter, ultrafilter and the like. It is preferable to remove a residual dispersion solvent by filter filtralation, so as to further concentrate pigment fine particles in the concentrated extract liquid and to obtain a concentrated pigment liquid.

A method for freeze-drying is not particularly limited, and any method may be adopted as long as a person skilled in the art can utilize the method. Examples of the freeze-drying method include a coolant direct expansion method, a multiple freezing method, a heating medium circulation method, a triple heat exchange method, and an indirect heating freezing method. Of these, the coolant direct-expansion method or the indirect heating freezing method is preferably employed, and the indirect heating freezing method is more preferably employed. In each method, preliminary freezing is preferably performed before freeze-drying is performed. Conditions for the preliminary freezing are not particularly limited, but a sample to be subjected to freeze-drying must be uniformly frozen.

Examples of a device for the indirect heating freezing method include a small freeze-drying machine, an FTS freeze-drying machine, an LYOVAC freeze-drying machine, an experimental freeze-drying machine, a research freeze-drying machine, a triple heat exchange vacuum freeze-drying machine, a monocooling-type freeze-drying machine, and an HULL freeze-drying machine. Of these, the small freeze-drying machine, the experimental freeze-drying machine, the research freeze-drying machine, or the monocooling-type freeze-drying machine is preferably used, and the small freeze-drying machine or the monocooling-type freeze-drying machine is more preferably used.

The temperature for freeze-drying, which is not particularly limited, is, for example, about −190 to −4° C., preferably about −120 to −20° C., and more preferably about −80 to −60° C. The pressure for freeze-drying is not particularly limited either, and can be appropriately selected by a person skilled in the art. It is recommended that freeze-drying be performed under a pressure of, for example, about 0.1 to 35 Pa, preferably about 1 to 15 Pa, and more preferably about 5 to 10 Pa. The time for freeze-drying is, for example, about 2 to 48 hours, preferably about 6 to 36 hours, or more preferably about 16 to 26 hours. It should be noted, however, that these conditions can be appropriately selected by a person skilled in the art. With regard to a method for freeze-drying, reference can be made to, for example, Pharmaceutical machinery and engineering handbook by JAPAN SOCIETY OF PHARMACEUTICAL MACHINERY AND ENGINEERING, Chijinshokan Co., Ltd., p. 120-129 (September, 2000), Vacuum handbook by ULVAC, Inc., Ohrnsha, Ltd., p. 328-331 (1992), or Freezing and drying workshop paper by Koji Ito et al., No. 15, p. 82 (1965).

Herein, centrifugal separation is described below. The centrifugal separator for use in the condensation of the pigment fine particles by centrifugal separation may be an arbitrary device as long as the pigment fine particles in the pigment dispersion (or the pigment concentrated extract liquid) can be sedimented. Examples of the centrifugal separator include a general-purpose device, a system having a skimming function (function with which a supernatant layer is sucked during the rotation of the system, to discharge to the outside of the system), and a continuous centrifugal separator for continuously discharging solid matter.

As the conditions for centrifugal separation, a centrifugal force (a value representing a ratio of an applied centrifugal acceleration to the gravitational acceleration) is preferably 50 to 10,000, more preferably 100 to 8,000, and particularly preferably 150 to 6,000. The temperature at the time of centrifugal separation is preferably −10 to 80° C., more preferably −5 to 70° C., and particularly preferably 0 to 60° C., though a preferable temperature varies depending on the kind of the solvent of the dispersion.

Herein, drying is described below. The device for use in the condensation of the pigment fine particles by drying under reduced pressure is not particularly limited as long as the solvent of the pigment dispersion (or the pigment concentrated extract liquid) can be evaporated. Examples of the device include a general-purpose vacuum drier and a general-purpose rotary pump, a device capable of drying a liquid under heat and reduced pressure while stirring the liquid, and a device capable of continuously drying a liquid by passing the liquid through a tube the inside of which is heated and reduced in pressure.

The temperature for drying under heat and reduced pressure is preferably 30 to 230° C., more preferably 35 to 200° C., or particularly preferably 40 to 180° C. The pressure for the above-mentioned reduced pressure is preferably 100 to 100,000 Pa, more preferably 300 to 90,000 Pa, and particularly preferably 500 to 80,000 Pa.

According to the condensation method as described above, the pigment fine particles can be efficiently concentrated from the pigment dispersion. The condensation ratio is, for example, as follows: when the concentration of the nanoparticles in the pigment serving as a raw material is set to 1, the concentration in a concentrated pigment paste can be preferably about 100 to 3,000 times, and more preferably about 500 to 2,000 times.

In the producing method of the inkjet ink for color filter of the present invention, it is preferable that the pigment fine particles obtained are concentrated, and then undergo fining and dispersing treatment again in an organic solvent containing a binder (hereinafter, also referred to simply as "re-dispersion"). (In the present specification, the term "fining and dispersing" means a process to release particles in a dispersion from the aggregation state, thereby to enhance degree of dispersion.)

In the case of using for color filter, for example, the particles can be added to a vehicle, to be dispersed. If paint is taken as an example, the vehicle means a portion of a medium in which a pigment is dispersed when the paint is in a liquid state. The vehicle is a liquid state and contains a portion (binder) that is to be bonded to the pigment to solidify a coating film and a component (organic solvent) for dissolving and diluting the portion. In the present invention, a binder to be used at the time of the formation of the pigment fine particles and a binder to be used in redispersing may be identical to or different from each other, and they are sometimes separately referred to as a pigment fine particle formation binder and a redispersion binder, respectively.

The concentration of the pigment in a dispersion composition of the pigment after re-dispersion can be properly determined in accordance with a purpose of their use. However, the concentration of the pigment is preferably in the range of from 2 to 30 mass %, more preferably in the range of from 4 to 20 mass %, and especially preferably in the range of from 5 to 15 mass %, based on the total amount of the dispersion composition. In the case where the pigment is dispersed with such vehicles as described above, amounts of the binder and the dissolution and dilution component can be properly determined depending on, for example, the kind of the pigment. However, the amount of the binder is preferably in the range of from 1 to 30 mass %, more preferably in the range of from 3 to 20 mass %, and especially preferably in the range of from 5 to 15 mass %, based on the total amount of the pigment dispersion composition. The amount of the dissolution and dilution component is preferably in the range of from 5 to 80 mass %, and more preferably in the range of from 10 to 70 mass %.

In the liquid of the concentrated extract pigment described above, in the case of state in which quick filtration through a filter is allowed, pigment fine particles ordinary aggregate by concentration. In addition, pigment fine particles concentrated by centrifugal separation or drying also aggregate by concentration.

Examples of a method that can be employed for dispersing such aggregated nanoparticles, include a dispersing method with using a supersonic wave and a method involving applying physical energy. (In the present specification, the term "aggregated nanoparticles" means an assembly of nanoparticles gathered together by a secondary force, such as aggregates.)

Apparatus for ultrasonic wave irradiation is preferably an apparatus that is capable of applying an ultrasonic wave at 10 kHz or more, and examples thereof include an ultrasonic wave homogenizer, an ultrasonic wave cleaning machine, and the like. The liquid temperature during ultrasonic wave irradiation is preferably kept at 1 to 100° C., more preferably 5 to 60° C., since increase in the liquid temperature leads to thermal aggregation of nanoparticles (see "Current Pigment Dispersion Technology", Technical Information Institute Co., Ltd., 1995, p. 166). The temperature can be controlled, for example, by adjusting the temperature of dispersion, by adjusting the temperature of a temperature-controlling layer for controlling of dispersion temperature, or the like.

A dispersion machine to be used at the time of dispersing the concentrated pigment fine particles by the application of physical energy is not particularly limited, and examples of the dispersion machine include a kneader, a roll mill, an attritor, a super mill, a dissolver, a homomixer, and a sand mill. Further, a high pressure dispersion method and a dispersion method of using fine particle beads are also exemplified as a preferable method.

In the present invention, a preferable method of producing a composition is a method in which a coloring agent undergoes kneading-and-dispersing treatment with a resin ingredient so that the resulting kneaded-and-dispersed matter would have a relatively high viscosity of 10,000 mPa·s or more, preferably 100,000 mPa·s or more, at 25° C., and then the kneaded-and-dispersed matter is subjected to finely dispersing treatment after a solvent is added thereto, so that the resultant fine dispersion liquid would have a relatively low viscosity of 1,000 mPa·s or less, preferably 100 mPa·s or less, at 25° C.

Examples of a machine used in the kneading-and-dispersing treatment include a two-rod roll, a three-rod roll, a ball mill, a trom mill, a disper, a kneader, a cokneader, a homogenizer, a blender, a single screw extruder and a double screw extruder. These machines each carry out dispersion while giving a strong shearing force to ingredients to be dispersed. Then, a solvent is added, and the finely dispersing treatment is performed by mainly using a vertical or horizontal sand grinder, a pin mill, a slit mill, an ultrasonic dispersing machine or a high-pressure dispersing machine, together with beads which range in size from 0.1 mm to 1 mm and are made of glass, zirconia or the like. Further, precision dispersing treatment can also be performed by use of minute-particle beads smaller than 0.1 mm in size. Alternatively, it is possible to omit the kneading-and-dispersing treatment. In this case, beads dispersion is carried out using a pigment, a dispersing agent or a surface treating agent, and the acrylic copolymer and the solvent as recited in the present invention.

Alternatively, it is possible to carry out dispersion treatment of a main pigment and that of an auxiliary pigment separately, then mix the resulting dispersions, and further subject the resulting mixture to dispersion treatment, and it is also possible to subject a main pigment, together with an auxiliary pigment, to dispersing treatment.

Incidentally, details of kneading and dispersing operations are also described in T. C. Patton, *Paint Flow and Pigment Dispersion*, John Wiley & Sons (1964), and the methods published therein may be adopted.

In the present invention, any of commonly-used pigment dispersing agents and surfactants may be added for the purpose of enhancing the dispersibility of pigments. As these dispersing agents, various kinds of compounds can be used. Examples of such compounds include phthalocyanine derivatives (EFKA-6745, a commercial product (manufactured by EFKA ADDITIVES)), SOLSPERSE 5000 (manufactured by ZENECA); organosiloxane polymer KP341 (manufactured by Shin-Etsu Chemical Co., Ltd.), (meth)acrylic acid (co) polymers POLYFLOW No. 75, No. 90 and No. 95 (manufactured by Kyoeisha Yushi Kagaku Kogyo Co., Ltd.), a cationic surfactant such as W001 (manufactured by Yusho Co., Ltd.); nonionic surfactants, such as polyoxyethylene lauryl ether, polyoxyethylene stearyl ether, polyoxyethylene oleyl ether, polyoxyethylene octyl phenyl ether, polyoxyethylene nonyl phenyl ether, polyoxyethylene glycol dilaurate, polyethylene glycol distearate and sorbitan fatty acid ester; anionic surfactants such as W004, W005 and W017 (manufactured by Yusho Co., Ltd.); polymeric dispersants such as EFKA-46, EFKA-47, EFKA-47EA, EFKA POLYMER 100, EFKA POLYMER 400, EFKA POLYMER 401 EFKA POLYMER 450 (manufactured by Morishita & Co., Ltd.), and Disperse Aid 6, Disperse Aid 8, Disperse Aid 15 and Disperse Aid 9100 (manufactured by San Nopco Limited); various Solsperse dispersants including Solsperse 3000, 5000, 9000, 12000, 13240, 13940, 17000, 24000, 26000 and 28000 (manufactured by ZENECA); Adeka Pluronic L31, F38, L42, L44, L61, L64, F68, L72, P95, F77, P84, F87, P94, L101, P103, F108, L121 and P-123 (manufactured by ADEKA CORPORATION), and Isonet S-20 (manufactured by Sanyo Chemical Industries, Ltd.). In addition, the pigment dispersants disclosed in JP-A-2000-239554, the compound (C) disclosed in JP-B-5-72943, the compound of Synthesis Example 1 described in JP-A-2001-31885, and so on can be preferably used, too.

As the dispersants used in formation of the pigment fine particles for re-dispersion, the compounds exemplified in the above "Dispersing agent" can also be used preferably.

In the pigment dispersion composition, it is possible to make the pigment fine particles after re-dispersion (primary particles) into finely-dispersed particles and adjust their sizes to a range of preferably 1 to 200 nm, more preferably 2 to 100 nm, and particularly preferably 5 to 50 nm. The Mv/Mn of particles after re-dispersion is preferably from 1.0 to 2.0, more preferably from 1.0 to 1.8, and particularly preferably from 1.0 to 1.5.

In the present invention, the pigment fine particles contained in the pigment dispersion composition or the inkjet ink for color filter described hereinafter, even though their particle sizes are of the order of nanometers (for example, 10 to 100 nm), are in a state of being concentrated and re-dispersed in the desired sizes. Therefore, the color filter in which the present pigment dispersion composition or inkjet ink is used can have high optical density, excellent uniformity at the surface, and high contrast, and allows noise reduction of images.

Further, the method according to the present invention can disperse pigment particles into a state of being uniformly fined to a high degree, therefore the pigment dispersion composition or inkjet ink containing the particles can deliver high coloring density even when the film thickness is thin and can ensure, for example, reduction in color filter thickness.

By incorporating pigment having a clear tone and a high coloring power as the pigment in the pigment dispersion composition or inkjet ink for color filter, the resulting compositions can be used to advantage as an image forming material for production of color filter.

Furthermore, since an alkali developer is used in an exposure-development process for formation of colored images, a binder soluble in an alkaline aqueous solution can be used in the pigment dispersion composition or inkjet ink for color filter, and thereby an environmental requirement can also be satisfied.

In the present invention, it is also possible to use an organic solvent having a moderate drying property as the solvent (a dispersing medium for the pigment) to be used in the pigment dispersion composition or the inkjet ink for color filter, so the requirement for the drying capability after coating can be satisfied too.

The inkjet ink for color filter of the present invention contains (a) fine pigment particles formed and (b) a polymerizable monomer and/or a polymerizable oligomer. The inkjet ink for color filter of the present invention preferably contains (a) fine pigment particles formed, (b) a polymerizable monomer and/or a polymerizable oligomer, (c) a binder, and (d) a photopolymerization initiator or a photopolymerization initiator system, more preferably contains (1) fine pigment particles formed by mixing a solution of pigment dissolved in a good solvent with a poor solvent compatible with the good solvent in the presence of a binder (A), thereby forming the pigment as fine particles; (2) a binder (B); (3) a monomer or an oligomer; and (4) a photopolymerization initiator or a photopolymerization initiator system. Herein, the binders (A) and (B) may be the same or different. The ingredients (a) to (d) and so on in the inkjet ink for color filter of the present invention are described below.

The method of producing the pigment fine particles has been described in detail. The content of the pigment fine particles is preferably from 3 to 90% by mass, more preferably from 20 to 80% by mass, and further preferably from 25 to 60% by mass, based on the total solids of the inkjet ink for color filter (as used herein, the term "total solids" refers to the total amount of all the components of the composition, exclusive of the organic solvent(s)). When the content is too high, there sometimes occurs an increase in viscosity of the resultant dispersion liquid and leading to a problem in production suitability. When the content is too low, on the other hand, sufficient coloring power cannot be obtained. In order to perform a function as a coloring agent, it is preferred that the pigment fine particles have a particle diameter of preferably 0.1 μm or less, especially preferably 0.08 μm or less. For the purpose of toning, the pigment fine particles may be used in combination with pigments in common use. As the pigments, those recited hereinbefore as pigments (or dyestuffs, coloring agents, or dyes) can be used.

The polymerizable monomer and/or polymerizable oligomer contained in the inkjet ink for color filter of the present invention is preferably a monomer or oligomer which has two or more ethylenically unsaturated double bonds and which undergoes addition-polymerization by irradiation with light. The monomer or oligomer may be a compound having at least one addition-polymerizable ethylenically unsaturated group therein and having a boiling point of 100° C. or higher at normal pressure. Examples thereof include: a monofunctional acrylate and a monofunctional methacrylate such as dipentaerythritol hexa(meth)acrylate, polyethylene glycol mono(meth)acrylate, polypropylene glycol mono(meth)acrylate, and phenoxyethyl(meth)acrylate; polyethylene glycol di(meth)acrylate, polypropylene glycol di(meth)acrylate, trimethylolethane triacrylate, trimethylolpropane tri(meth)acrylate, trimethylolpropane diacrylate, neopentyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth)acrylate, trimethylolpropane tri(acryloyloxypropyl) ether, tri(acryloyloxyethyl)isocyanurate, tri(acryloyloxyethyl)cyanurate, glycerin tri(meth)acrylate; a polyfunctional acrylate or polyfunctional methacrylate which may be obtained by adding ethylene oxide or propylene oxide to a polyfunctional alcohol such as trimethylolpropane or glycerin and converting the adduct into a (meth)acrylate. Further, another preferred examples include those compounds that are obtained by addition reaction of ethylene oxide or propylene oxide to polyfunctional alcohol, followed by (meth)acrylation, as described in formulae (1) and (2) of JP-A-10-62986.

Examples of the polymerizable monomer and the polymerizable oligomer further include urethane acrylates as described in JP-B-48-41708, JP-B-50-6034, and JP-A-51-37193; and polyester acrylates as described in JP-A 48-64183, JP-B-49-43191, and JP-B-52-30490; polyfunctional acrylates or polyfunctional methacrylates such as an epoxy acrylate which is a reaction product of an epoxy resin and (meth)acrylic acid.

Among these, trimethylolpropane tri(meth)acrylate, pentaerythritol tetra(meth)acrylate, dipentaerythritol hexa(meth)acrylate, and dipentaerythritol penta(meth)acrylate are preferable.

Further, other than the above, "polymerizable compound B" described in JP-A-11-133600 can be mentioned as a preferable example.

These polymerizable monomers or polymerizable oligomers preferably have a molecular weight of 200 to 1000, and they may be used singly or as a mixture of two or more kinds thereof. The content of the polymerizable monomer or the polymerizable oligomer is generally in a range of from 5 mass % to 50 mass %, preferably from 10 mass % to 40 mass %, based on the total solid content in the inkjet ink for color filter. If this content is too large, control of development properties becomes difficult, raising problems of production suitability. If the content is too small, a curing force at the time of exposure becomes insufficient.

The redispersing binder used for redispersion is preferably an acidic group-containing binder, and those recited hereinbefore as the alkali-soluble binder having an acid group are preferably used as redispersing binders. The redispersing binder is preferably a compound having a similar structure to that of the pigment fine particles-forming alkali-soluble binder that is added when the pigment is formed into fine particles. Most preferably, both binders are the same. The content of the re-dispersion alkali-soluble binder (which may be the sum total of the content of the re-dispersion alkali-soluble binder and the residual content of the pigment fine particle formation alkali-soluble binder when the latter binder remains) is generally from 15 to 50 mass %, preferably from 20 to 45 mass %, based on the total solids in the inkjet ink for color filter. If the amount of the binder is too large, viscosity of the composition becomes too high, which causes problem in production suitability. On the other hand, if the amount of the binder is too small, problems in coating film formation arise.

Examples of the photopolymerization initiator or the photopolymerization initiator series (in the present specification, the term "photo-polymerization initiator series" means a polymerization initiating mixture that exhibits a function of photo-polymerization initiation with a plurality of compounds combined with each other) include vicinal polyketaldonyl compounds disclosed in U.S. Pat. No. 2,367,660, acyloin ether compounds described in U.S. Pat. No. 2,448,828, aromatic acyloin compounds substituted by an α-hydrocarbon described in U.S. Pat. No. 2,722,512, polynuclear quinone compounds described in U.S. Pat. No. 3,046,127 and U.S. Pat. No. 2,951,758, combinations of triarylimidazole dimer and p-aminoketone described in U.S. Pat. No. 3,549,367, benzothiazole compounds and trihalomethyl-s-triazine compounds described in JP-B-51-48516, trihalomethyl-triazine compounds described in U.S. Pat. No. 4,239,850, and trihalomethyloxadiazole compounds described in U.S. Pat. No. 4,212,976. In particular, trihalomethyl-s-triazine, trihalomethyloxadiazole, and triarylimidazole dimer are preferable.

In addition, "polymerization initiator C" described in JP-A-11-133600, and oximes such as 1-phenyl-1,2-propanedion-2-(o-ethoxycarbonyl)oxime, 0-benzoyl-4'-(benzmercapto)benzoyl-hexyl-ketoxime, 2,4,6-trimethylphenylcarbonyl-diphenylphosphonyloxide, and hexafluorophosphoro-trialkylphenyl phosphonium salt can also be mentioned as preferable examples.

These photopolymerization initiators and photopolymerization initiator series each may be used singly. Alternatively, a mixture of two or more selected from these photopolymerizable initiators and photopolymerization initiator series may be used. In particular, it is preferable to use two or more selected from photopolymerizable initiators and photopolymerization initiator series. When two or more selected from photopolymerizable initiators and photopolymerization initiator series are used, the display property, particularly evenness of display, can be improved.

As to the content of the photo-polymerization initiator and the photo-polymerization initiator series, the content is generally in the range of from 0.5 to 20 mass %, preferably from 1 to 15 mass %, based on the total solid content in the inkjet ink for color filter. If the amount of the initiator or the initiator series is too large, exposure sensitivity becomes too high, which causes difficulty in control. If the amount of the initiator or the initiator series is too small, exposure sensitivity becomes too low.

In addition to the above-described components, an organic solvent may further be used in the inkjet ink for color filter of the present invention. There is no limitation as to the organic solvent. Examples of the organic solvent include esters, such as ethyl acetate, n-butyl acetate, isobutyl acetate, amyl formate, isoamyl acetate, isobutyl acetate, butyl propionate, isopropyl butylate, ethyl butylate, butyl butylate, an alkyl ester compound, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, alkyl 3-oxypropionate compound (e.g. methyl 3-oxypropionate and ethyl 3-oxypropionate), methyl 3-methoxypropionate, ethyl 3-methoxypropionate, methyl 3-ethoxypropionate, ethyl 3-ethoxypropionate; methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, and ethyl 2-oxobutanoate; ethers, such as diethylene glycol dimethyl ether, tetrahydrofuran, ethylene glycol monomethyl ether, ethylene glycol monoethyl ether, methylcellosolve acetate, ethylcellosolve acetate, diethylene glycol monomethyl ether, propylene glycol methyl ether acetate; ketones, such as methyl ethyl ketone, methyl isobutyl ketone, cyclohexanone, cyclohexanol, 2-heptanone, and 3-heptanone; and aromatic hydrocarbons, such as toluene and xylene. Among these solvents, as the solvent to be used in the present invention, methyl 3-ethoxypropionate, ethyl 3-ethoxypropionate, ethyl cellosolve acetate, ethyl lactate, butyl acetate, methyl 3-methoxypropionate, 2-heptanone, cyclohexanone, ethyl carbitol acetate, butyl carbitol acetate, propylene glycol methyl ether acetate and the like are preferable. These solvents may be used singly or in combination of two or more thereof.

Further, if necessary, a solvent having a boiling point of from 180° C. to 250° C. may be used. Examples of the high boiling solvent include diethyleneglycol monobutylether, diethyleneglycol monoethyletheracetate, diethyleneglycol monoethylether, 3,5,5-trimethyl-2-cyclohexene-1-on, butyl lactate, dipropyleneglycol monomethyletheracetate, propyleneglycol monomethyletheracetate, propyleneglycol diacetate, propyleneglycol-n-propyletheracetate, diethyleneglycol diethylether, 2-ethylhexylacetate, 3-methoxy-3-methylbutylacetate, γ-butyllactone, tripropyleneglycol methylethylacetate, dipropyleneglycol n-butylacetate, propyleneglycol phenyletheracetate, and 1,3-butanediol diacetate.

The content of the solvent is preferably 10 to 95 mass % based on the total content of the inkjet ink for color filter.

Conventional color filters had a problem that the color of each pixel was deep in order to realize a high color purity, whereby unevenness of the film thickness of pixels was directly recognized as color unevenness. For this reason, it has been desired to suppress the film thickness change, which directly influences the film thickness of pixels.

In the color filter of the present invention, the inkjet ink for color filter preferably comprises a suitable surfactant from the viewpoint of achieving a uniform film thickness and of prevention of color unevenness caused by change in the film thickness effectively.

Preferable examples of the surfactant include surfactants disclosed in JP-A-2003-337424 and JP-A-11-133600. The content of the surfactant is preferably 5 mass % or less based on the total content of the resin composition.

It is preferred that the inkjet ink for color filter of the present invention include a thermal polymerization inhibitor. Examples of the thermal polymerization inhibitor include hydroquinone, hydroquinone monomethyl ether, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), 2-mercaptobenzimidazole, and phenothiazine. The content of the thermal polymerization inhibitor is preferably 1 mass % or less based on the total content of the inkjet ink for color filter.

If necessary, in addition to the aforementioned coloring agent (pigment), the inkjet ink for color filter of the present invention may further include a coloring agent (a dye or a pigment). When the coloring agent is a pigment, the pigment is preferably dispersed in the inkjet ink for color filter uniformly; therefore, the particle diameter of such a pigment is preferably 0.1 µm or smaller, more preferably 0.08 µm or smaller.

Examples of the dye and pigment include the colorants disclosed in paragraph Nos. [0038] to [0040] of JP-A-2005-17716, pigments disclosed in paragraph Nos. [0068] to [0072] of JP-A-2005-361447, and coloring agents disclosed in paragraph Nos. [0080] to [0088] of JP-A-2005-17521. The content of dyes or pigments to be used supplementarily is preferably 5 mass % or less based on the total content of the inkjet ink for color filter.

If necessary, the inkjet ink for color filter of the present invention may include an ultraviolet absorber. Examples of the ultraviolet absorber include compounds disclosed in JP-A-5-72724, a salicylate-based ultraviolet absorber, a benzophenone-based ultraviolet absorber, a benzotriazole-based ultraviolet absorber, a cyanoacrylate-based ultraviolet absorber, a nickel-chelate-based ultraviolet absorber, and a hindered-amine-based ultraviolet absorber.

Specific examples thereof include phenyl salicylate, 4-t-butyl phenylsalicylate, 2,4-di-t-butyl phenyl-3',5'-di-t-4'-hydroxybenzoate, 4-t-butyl phenylsalicylate, 2,4-dihydroxybenzophenone, 2-hydroxy-4-methoxybenzophenone, 2-hydroxy-4-n-octoxybenzophenone, 2-(2'-hydroxy-5'-methylphenyl)benzotriazole, 2-(2'-hydroxy-3'-t-butyl-5'-methylphenyl)-5-chlorobenzotriazole, ethyl-2-cyano-3,3-diphenyl acrylate, 2,2'-hydroxy-4-methoxybenzophenone, nickel dibutyl dithiocarbamate, bis(2,2,6,6-tetramethyl-4-pyridine)-sebacate, 4-t-butyl phenylsalicylate, phenyl salicylate, 4-hydroxy-2,2,6,6-tetramethylpiperidine condensate, succinic acid-bis(2,2,6,6-tetramethyl-4-piperidenyl)-ester, 2-[2-hydroxy-3,5-bis(α, α-dimethylbenzyl)phenyl]-2H-benzotriazole, and 7-{[4-chloro-6-(diethylamino)-5-triazine-2-yl]amino}-3-phenylcoumarin. The content of the ultraviolet absorber is preferably 5 mass % or less based on the total content of the inkjet ink for color filter.

In addition to the aforementioned additives, the inkjet ink for color filter of the present invention may further include an "adhesion auxiliary" described in JP-A-11-133600 and other additives.

In the inkjet ink for color filter of the present invention, it is preferred to control the temperature of the ink so that a deviation of viscosity of the ink would be within ±5%. The viscosity at the time of ink injection is preferably from 5 to 25 mPa·s, more preferably from 8 to 22 mPa·s, and especially preferably from 10 to 20 mPa·s (the viscosity used in the present specification is a value at 25° C., unless specifically indicated otherwise). In addition to setting of the above-described injection temperature, the viscosity may be adjusted by controlling the kind of components to be contained in the ink and the amount thereof. The viscosity may be measured using ordinary equipments such as a cone-and-plate-system rotational viscometer and an E type viscometer.

It is preferred that the surface tension of the ink at the time of ink injection be from 15 to 40 mN/m, from the viewpoint of improvement in smoothness (flatness) of the pixel (surface tension used in the present specification is a value at 23° C. unless specifically indicated otherwise). The surface tension is more preferably from 20 to 35 mN/m, and most preferably from 25 to 30 mN/m. The surface tension may be adjusted by adding surfactants and selecting the kind of solvent to be used. The surface tension may be measured according to a platinum plate method using known measuring equipments such as a surface tension-measuring device (CBVP-Z, manufactured by Kyowa Interface Science Co., Ltd.) and a full automatic balancing type electro surface tensiometer ESB-V (manufactured by Kyowa Science).

As a method of spraying the inkjet ink for color filter of the present invention, it is possible to employ any of various methods such as a method of continuously spraying an electrified ink and then controlling the ink by electric field, and a method of intermittently spraying an ink using a piezoelectric element, and a method of intermittently spraying an ink with utilizing bubbles generated by heating the ink.

As to the inkjet method used for forming each pixel (image element), any of ordinary methods such as a method of thermally curing an ink, a photo-curing method, and a method of previously forming a transparent image-receiving layer on a substrate, followed by stroke of ink droplets.

As an inkjet head (hereinafter sometimes simply referred to as a head), ordinary heads, such as continuous type heads and dot-on-demand type heads can be used. Of these dot-on-demand-type heads, preferred as thermal heads are those of the type having a movable bulb for discharge as described in JP-A-9-323420. As the piezo head, use can be made of heads described in, for example, EP 277,703A and EP 278,590A. It is preferred that the head has a temperature control function so that the temperature of the ink can be managed. Specifically, it is preferred to set an injection temperature so that the viscosity at the time of injection would be within the range of from 5 to 25 mPa·s and to control the temperature of the ink so that the deviation of the viscosity would be within ±5%. It is preferred that the head operates with a drive frequency in the range of from 1 to 500 kHz.

After formation of each pixel (image element), it is possible to set a heat step in which a thermal processing (a so-called bake processing) is performed. In the heat step, a substrate having thereon a layer photo-polymerized by light irradiation is heated in a heating machine such as an electric furnace and a drying oven, or alternatively said substrate is irradiated using an infrared lamp. The temperature and time required for heating depend on a composition of the colored photosensitive composition and the thickness of the formed layer. Generally, it is preferred to heat at a temperature of from about 120° C. to about 250° C. for a period of time ranging from about 10 minutes to about 120 minutes, from such the viewpoints of attaining sufficient solvent resistance, alkali resistance, and ultraviolet absorbance.

The pattern shape of the thus-formed color filter is not particularly limited. Accordingly, it may be a stripe shape, which is a general black matrix shape, or a lattice shape, or a delta configuration shape.

In the present invention, it is preferred to use a preparation method in which a barrier is formed prior to the image element-forming step using the above-described inkjet ink for color filter, and then the ink is supplied to a portion (a recess) surrounded with the barrier. The barrier is not particularly limited. However, in the case where a color filter is formed, it is preferred to use a barrier having a black matrix function and a light shielding effect (hereinafter, such the barrier is simply referred to as "barrier"). The barrier may be prepared by the same materials and according to the same method as ordinary black matrixes for color filter. Examples of the black matrix include those described in paragraph Nos. [0021] to [0074] of JP-A-2005-3861 and paragraph Nos. [0012] to [0021] of JP-A-2004-240039, and black matrixes for inkjet described in paragraph Nos. [0015] to [0020] of JP-A-2006-17980 and paragraph Nos. [0009] to [0044] of JP-A-2006-10875.

Next, a photosensitive resin transfer material will be explained.

The photosensitive resin transfer material that can be used in the method of producing the color filter of the present invention is a material having at least a light-shielding resin layer on a temporary support. The light-shielding resin layer can be transferred to a substrate by pressure adhering to the substrate.

The photosensitive resin transfer material is preferably formed by using the photosensitive resin transfer material as described in JP-A-5-72724, that is a composite film. The structure of the composite film may be, for example, a lamination in which a temporary support, a thermoplastic resin layer, an intermediate layer, a photosensitive resin layer, and a protective film are disposed in this order. (In the present invention, the term "photosensitive resin layer" means a layer of a resin curable by irradiation with light. When the resin has a light-shielding effect, the photosensitive resin layer is referred to as "a light-shielding resin layer" too, while it is referred to as "a colored resin layer" too when the resin is colored in the desired color.)

Preferable examples of the temporary support, the thermoplastic resin layer, the intermediate and the protective film, which constitute the photosensitive resin transfer material for use in the present invention, and a method of producing the transfer material include those described in paragraph Nos. [0023] to [0066] of JP-A-2005-3861.

Coating operation in the above methods may be performed by an ordinary coating apparatus described in paragraphs [0023] to [0066] of JP-A-2005-3861. In the present invention, it is preferable to conduct the coating operation with a coating apparatus (slit coater) using a slit nozzle as described below.

The coating film can be preferably formed by using a slit nozzle having a slit at a portion through which the coating liquid is discharged. Specifically, preferable are slit nozzles and slit coaters described in JP-A-2004-89851, JP-A-2004-17043, JP-A-2003-170098, JP-A-2003-164787, JP-A-2003-10767, JP-A-2002-79163, and JP-A-2001-310147.

As a coating method on a substrate, a spin coating is excellent in such the point that a thin film of 1 µm to 3 µm can be uniformly coated with high precision. Therefore, the spin coating can be widely and generally used for preparation of color filters. In recent yeas, however, it is required to further improve production efficiency and production cost in accordance with inclination to large-sized liquid crystal display devices and mass production thereof. Therefore, the slit coating, which is more suited for coating on a wide and large area substrate than the spin coating, has been adopted in production of color filters. Besides, the slit coating is superior to the spin coating from the viewpoint of saving of liquid to be used; and the slit coating can obtain a uniform coating from a lesser coating amount.

The slit coating is a coating method characterized by the steps of using a coating head having a slit (gap) of a width of several ten microns at a tip and having a length corresponding to the coating width of a rectangular substrate, and moving the substrate and/or the coating head at a definite relative speed, while maintaining a clearance (gap) between the substrate and the coating head at a distance of from several ten microns to several hundred microns, and coating on the substrate a coating liquid fed from the slit in a predetermined discharge amount. The slit coating has such advantages as follows: (1) a liquid loss is less than a spin coating; (2) a workload at the time of conducting a wash processing is reduced because no coating liquid would be spattered; (3) no contamination (re-inclusion) owing to the spattered liquid component to a coating film would be caused; (4) a tact time is shortened because no dwell time to start up spinning is necessary; (5) it easily coats a large-sized substrate. From these advantages, the slit coating is suitable to production of a color filter for a large-sized-screen liquid crystal display device, and the slit coating has been expected as a coating method that is also useful for reduction in a coating amount of the liquid.

A coating film of much larger area can be formed by the slit coating than the spin coating. Therefore, it is necessary to keep a certain degree of relative speed between a coater and a material to be coated at the time when a coating liquid is discharged from a wide slit exit. For this reason, a good fluidity is required to a coating liquid used for the slit coating method. Further, it is particularly required for the slit coating to maintain various conditions of the coating liquid fed from a slit of the coating head to a substrate constant over the entire coating width. If solution physical properties such as fluidity and viscoelastic properties of the coating liquid are insufficient, a coating unevenness easily occurs, so that it becomes difficult to keep a coating thickness constant toward the direction of a coating width. Consequently, the coating unevenness causes such the problem that it is difficult to obtain a uniform coating.

In view of the above, various studies on improvement of fluidity and viscoelastic properties of the coating liquid have been made in order to obtain a uniform coating film with no unevenness. As mentioned above, many means have been proposed such as reduction in molecular weight of a polymer, selection of a polymer excellent in solubility in a solvent, selection from various solvents in order to control an evaporation rate, and application of a surfactant. However, these means were not satisfactory to improve the above-described problems.

The color filter of the present invention is excellent in contrast. The term "contrast" used in the present specification means a ratio of the amount of transmitted light when polarization axes are parallel to the amount of transmitted light when polarization axes are perpendicular, with respect to a color filter placed between two polarizing plates (see, for example, The 7th Color Optics Conference 1990; Color Filter for 512-color 10.4"-size TFT-LCD; Ueki, Koseki, Fukunaga, Yamanaka).

The color filter having a high contrast enables enlarging a discrimination of brightness at the time when the color filter is combined with a liquid crystal. Therefore, the high contrast is a very important performance in enhancing replacement of CRTs by liquid crystal display devices.

In the case where the color filter of the present invention is used as a color filter for a television monitor, the difference (ΔE) between the chromaticity of the red (R) measured under a F10 light source and the target chromaticity for red shown in the following table, the difference (ΔE) between the chromaticity of the green (G) measured under a F10 light source and the target chromaticity for green shown in the following table, the difference (ΔE) between the chromaticity of the blue (B) measured under a F10 light source and the target chromaticity for blue shown in the following table, are each preferably 5 or less, more preferably 3 or less, still more preferably 2 or less.

|   | x | y | Y |
|---|---|---|---|
| R | 0.656 | 0.336 | 21.4 |
| G | 0.293 | 0.634 | 52.1 |
| B | 0.146 | 0.088 | 6.90 |

Herein, chromaticity in the present invention is measured by a microscopic spectrophotometer (OSP100 or 200, manufactured by Olympus Optics) and expressed in terms of xyY values of the xyz color system obtained by calculation as a result under an F10-light source at 2-degree viewing angle. In addition, the difference from the target chromaticity is expressed in terms of a color difference of a La*b* color system.

The color filter of the present invention is prepared by forming light-shielding barriers on a substrate so as to make a plurality of recesses partitioned by the barriers, and then injecting R (red) ink, G (green) ink and B (blue) ink into the respective recesses and depositing, in accordance with an inkjet method, so as to form colored resin layers of individual colors on the respective recesses. Herein, at least one of the R ink, the G ink and the B ink contains fine pigment particles formed. The fine pigment particles formed incorporated into the ink is preferably formed by mixing a pigment solution dissolving a pigment in a good solvent with a solvent compatible with the good solvent, but poor solvent for the pigment, thereby forming the pigment as fine particles of nanometer sizes.

For forming the light-shielding barriers on a substrate, it is preferable that a photosensitive resin transfer material having a light-shielding resin layer on a temporary support is prepared, and the light-shielding resin layer is transferred to the substrate from the photosensitive resin transfer material.

In the method of producing color filter of the present invention, the colored resin layer is formed on the recesses made on the substrate, by injecting and depositing the inkjet ink for color filter. For injecting the inkjet ink for color filter, commonly-used injecting apparatus can be used, and conventional apparatus for inkjet is preferably used as already mentioned in the description about the injecting method of an inkjet ink for color filter. In the case of forming the colored resin layer by injecting and depositing, the thickness of colored resin layer is preferably in a range of from 1.0 to 3.0 μm, more preferably from 1.0 to 2.5 μm, particularly preferably from 1.5 to 2.5 μm.

Using the photosensitive resin transfer material, the light-shielding resin layer formed into a film shape may be adhered to a substrate explained below by a heated and/or pressurized roller or flat plate by pressure adhesion or heat pressure adhesion. Specifically, laminators and laminating methods described in the following documents may be used: JP-A-7-110575, JP-A-11-77942, JP-A-2000-334836, and JP-A-2002-148794. From the viewpoint of suppression of contamination by foreign substances, it is preferable to use the method described in JP-A-7-110575. The preferred thickness of the film, when forming a light-shielding resin layer with the above-described photosensitive resin transfer material, is the same as the thickness described in the section of [photosensitive resin transfer material].

When a colored pixel is formed according to an inkjet method in the present invention, the height of the light-shielding barriers is preferably 1.0 μm or more, more preferably from 1.5 μm to 10 μm, still more preferably from 1.8 μm to 7.0 μm, and particularly preferably from 2.0 μm to 5.0 μm. By adjusting the height to, for example, a range of from 1.5 μm to 10 μm, an inkjet ink can be effectively prevented from sticking out of the barriers and climbing over barriers into adjacent pixels (color mixing). When the height is lower than 1.5 μm, color mixing tends to occur, while when the height is higher than 10 μm, it becomes difficult to form the light-shielding barriers.

In addition, the optical density of the light-shielding barriers at 555 nm is preferably 2.5 or more, more preferably from 2.5 to 10.0, still more preferably from 2.5 to 6.0, and particularly preferably from 3.0 to 5.0. Adjusting the optical density to the foregoing range is preferable for obtaining a color filter having a high contrast.

In the present invention, the substrate on which a color filter is to be formed may be, for example, a transparent substrate, and examples thereof include known glass plates such as a soda glass plate having a silicon oxide film on its surface, a low-expansion glass, a non-alkali glass, and a quartz glass plate, and a plastic film.

By subjecting the substrate to a coupling treatment in advance, adhesion of the substrate to the inkjet ink for color filter or the photosensitive resin transfer material can be improved. The method described in JP-A-2000-39033 is preferable as the coupling treatment. The thickness of the substrate is not particularly limited, and is preferably 700 to 1200 μm in general, and more 500 to 1100 μm.

In the color filter of the present invention, when the light-shielding barriers are formed, an oxygen blocking film may further be provided on the light-shielding resin layer, whereby the exposure sensitivity can be improved. Examples of the oxygen blocking film include the same ones as already mentioned in the description about the item of (Interlayer) of the [Photosensitive resin transfer material]. The thickness of the oxygen blocking film is not particularly limited, and the thickness is preferably 0.5 to 3.0 μm in general.

The process of forming the light-shielding barriers for use in the present invention includes exposure, development, post exposure and heating treatment steps, and thereto the process as described in paragraph Nos. [0067] to [0074] of JP-A-2005-3861 can be preferably applied.

In the case of forming the colored pixels by an inkjet method in the present invention, it is preferable that at least part of the upper surface of light-shielding barriers is given to a state of bearing water repellency by performing water-repellency-providing treatment on light-shielding barriers. This treatment is carried out in order to avoid such a trouble that, when droplets of inkjet ink are applied on the portion surrounded by the light-shielding barriers after formation of the light-shielding barriers, the ink climbs over the light-shielding barrier into the adjacency to cause color mixing.

Examples of a method for water-repellency-providing treatment include the method of coating the upper surface of light-shielding barriers with a water-repellent material (see, e.g., JP-A-10-123500), the method of newly forming a water-repellent layer (see, e.g., JP-A-5-241011), the method of providing water repellency by plasma treatment (see, e.g., JP-A-2002-62420), and the method of kneading a water-repellent material with a material for forming light-shielding barriers (see, e.g., JP-A-2005-36160).

After making the color filter having the light-shielding barriers and the colored pixels, there is a case where an overcoat layer is provided over the whole surface of the color filter for the purpose of improving resistance properties. Although the overcoat layer allows not only protection of the solidified layers of R ink, G ink and B ink but also leveling of the surface, it may be omitted from the viewpoint of an increase in the number of process steps.

Examples of a resin for fanning the overcoat layer (an OC agent) include an acrylic resin composition, an epoxy resin composition and a polyimide resin composition. Among these, the acrylic resin composition is preferred because it has high transparency in the visible region, and besides, it has excellent adhesion since a resin component of a photo-curable composition for color filer generally contains an acrylic resin as a main component. Examples of the overcoat layer include the overcoat layers described in paragraphs [0018] to [0028] of JP-A-2003-287618, and the commercial OC agent OPTOMER SS6699S (trade name) manufactured by JSR Corporation.

The liquid crystal display device of the present invention is excellent in definition such as black depth owing to the use of the color filter that is excellent in contrast according to the present invention. The liquid crystal display device of the present invention can be suitably used also as a large screen liquid crystal display device such as a display for a notebook computer and a television monitor.

Liquid crystal display devices are described in, for example, "Next-Generation Liquid Crystal Display Technology (edited by Tatsuo Uchida, and published by Kogyo Chosakai Publishing Inc. in 1994)". The liquid crystal display device to which the inkjet ink for color filter, the color filter and the producing method thereof according to the present invention are applied is not particularly limited, and the display device can be preferably applied to liquid crystal devices described in, for example, "Next-Generation Liquid Crystal Display Technology" and driven in various modes. Among them, the present invention is particularly effective in color TFT liquid crystal display devices. The color TFT liquid crystal display devices are described in, for example, "Color TFT Liquid Crystal Displays (published by Kyoritsu Shuppan Co., Ltd. in 1996)". The display device according to the present invention may also be applied to liquid crystal display devices with an extended angle of visibility, for example, those driven in a horizontal electric field drive mode such as IPS and those driven in a pixel division mode such as MVA. These modes are described in, for example, "Current Trend in Technology and Market of EL, PDP, and LCD displays" (published by Toray Research Center Inc., Technical Survey Dept. in 2001)" p. 43.

The liquid crystal display device according to the present invention generally includes various members such as an electrode substrate, a polarization film, a phase difference film, a backlight, a spacer, and a film compensating an angle of visibility, as well as the color filter. The black matrix according to the present invention can be applied to liquid crystal display devices containing these ordinary members. These members are described in, for example, "Market of Liquid Crystal Display-related Materials and Chemicals in 1994 (written by Kentaro Shima, and published by CMC Publishing in 1994)", and "Current Status and Future Prospect of Liquid Crystal-related Market (2nd vol.) (written by Ryokichi Omote, and published by Fuji Chimera Research Institute, Inc. in 2003)".

According to the present invention, it is possible to provide an inkjet ink for color filter which can be prevent ink-nozzle clogging at the time of injecting by dissolving pigment fine particles of nanometer sizes into the ink in a state of sharp particle-size distribution. Therefore, according to the inkjet ink for color filter of the present invention, it is possible to produce a color filter with rapid and efficient production by use of an inkjet method, at low cost.

Further, according to the inkjet ink for color filter of the present invention, it is possible to produce a color filter which shows high contrast and no roughness at the surface, and is prevented from developing unevenness of color and decreasing their color densities even when used over a prolonged period.

Furthermore, the liquid crystal display device equipped with the color filter according to the present invention is excellent in blackness and color reproducibility and improved in display irregularity, and besides, it can achieve an excellent effect of maintaining high display quality even when used over a prolonged period.

The present invention will be described in more detail based on the following examples, but the present invention is not limited thereto. In the examples "parts" means "mass parts", "%" means "mass %" and "molecular weight" means "weight-average molecular weight", unless otherwise indicated.

EXAMPLES

Example 1

3.3 ml of a 28% solution of sodium methoxide in methanol, 6,000 mg of a pigment (Pigment Red 254), 6,000 mg of polyvinyl pyrrolidone, and 600 mg of a pigment dispersing agent A (the above exemplified compound (7.)) were added to 100 ml of dimethyl sulfoxide, to prepare a pigment solution A. The pigment dispersing agent A was synthesized according to the method described in JP-A-2000-239554.

Separately, 1,000 ml of water containing 16 ml of 1-mol/l hydrochloric acid was prepared as a poor solvent.

200 ml of the pigment solution A were injected at a flow rate of 50 ml/min by using an NP-KX-500 large-volume nonpulsating pump manufactured by Nippon Fine Chemical into 1,000 ml of the water as the poor solvent whose temperature had been controlled to 1° C. and which had been stirred with a GK-0222-10 Ramond stirrer manufactured by Fujisawa Pharmaceutical Co., Ltd. at 500 rpm, whereby nanopigment particles were formed, and a pigment dispersion liquid A was prepared. The particle diameter and degree of monodispersion of the pigment dispersion liquid A were measured with a Nanotrac UPA-EX 150 manufactured by NIKKISO Co., Ltd. As a result, the liquid had a number average particle diameter of 34 nm and a ratio Mv/Mn of 1.37.

The prepared pigment dispersion liquid (having a nanopigment concentration of about 0.5 mass %) was added with 500 ml of 2-(1-methoxy)propylacetate, and the whole was stirred at 25° C. for 10 minutes at 500 rpm. After that, the resultant was left standing for 1 day, and a nanopigment was extracted to a 2-(1-methoxy)propylacetate phase, whereby a concentrated extract liquid was obtained.

The concentrated extract liquid containing the extracted nanopigment was filtered by using an FP-010 filter manufactured by SUMITOMO ELECTRIC FINE POLYMER INC., whereby a paste-like concentrated pigment liquid A (having a nanopigment concentration of 35 mass %) was obtained.
[Production of Photosensitive Resin Transfer Material]

A thermoplastic resin layer coating liquid having the following formulation H1 was coated on a polyethylene terephthalate film temporary support with a thickness of 75 μm using a slit nozzle, followed by drying. Then, an intermediate layer coating liquid having the following formulation P1 was coated thereon, and dried. Further, the light-shielding resin composition K1 having the composition as shown in Table 1 was coated thereon and dried. In this way, a thermoplastic resin layer with a dry film thickness of 15 μm, an intermediate layer with a dry film thickness of 1.6 μm, and a light-shielding resin layer with a dry film thickness of 2.4 μm were provided on the temporary support. Further, a protective film (polypropylene film with a thickness of 12 μm) was adhered by pressure.

As described above, a photosensitive resin transfer material was produced in which the temporary support, the thermoplastic resin layer, the intermediate layer (oxygen blocking film), and the light-shielding resin layer were unified, and named photosensitive resin transfer material K1.

| * Thermoplastic resin layer coating liquid: Formulation H1 | |
|---|---|
| Methanol | 11.1 parts |
| Propylene glycol monomethyl ether acetate (MMPG-Ac manufactured by Daicel Chemical Industries, Ltd. (The same material was used as Propylene glycol monomethyl ether acetate in the following examples.)) | 6.4 parts |
| Methyl ethyl ketone | 52.4 parts |
| Methyl methacrylate/(2-ethylhexyl acrylate)/benzyl methacrylate/methacrylic acid copolymer (copolymer composition ratio (mole ratio): Methyl methacrylate/2-ethylhexyl acrylate/benzyl methacrylate/methacrylic acid = 55/11.7/4.5/28.8, molecular weight = 100,000, Tg: about 70° C.) | 5.83 parts |
| Styrene-acrylic acid copolymer (copolymerization composition ratio (mole ratio): Styrene/acrylic acid = 63/37, molecular weight = 10,000, Tg: about 100° C.) | 3.6 parts |
| 2,2-Bis[4-methacryloxypolyethoxy)phenyl]propane (manufactured by Shin-Nakamura Chemical Co., Ltd.) | 9.1 parts |
| Surfactant 1 | 0.54 part |

| * Composition of Surfactant 1 (Megafac F-780-F (manufactured by DIC Corporation)) | |
|---|---|
| Copolymer of 40 parts of $C_6H_{13}CH_2CH_2OCOCH=CH_2$, 55 parts of $H(OCH(CH_3)CH_2)_7OCOCH=CH_2$ and 5 parts of $H(OCH_2CH_2)_7OCOCH=CH_2$, (molecular weight: $3 \times 10^4$) | 30 parts |
| Methyl ethyl ketone | 70 parts |

| * Intermediate layer (oxygen blocking layer) coating liquid: Formulation P2 | |
|---|---|
| Polyvinyl alcohol (PVA205 (saponification degree = 88%); manufactured by Kuraray Co., Ltd.) | 32.2 parts |
| Polyvinylpyrrolidone (PVP, K-30; manufactured by ISP Japan Ltd.) | 14.9 parts |
| Methanol | 429 parts |
| Distilled water | 524 parts |

TABLE 1

| Colored composition | K1 |
|---|---|
| K pigment dispersion 1 (carbon black) | 30 |
| Propylene glycol monomethyl ether acetate | 7.3 |
| Methyl ethyl ketone | 34 |
| Cyclohexanone | 8.6 |
| Binder 1 | 14 |
| DPHA liquid | 5.8 |
| 2,4-Bis(trichloromethyl)-6-[4'-(N,N-bisethoxycarbonylmethyl)amino-3'-bromophenyl]-s-triazine | 0.22 |
| Phenothiazine | 0.006 |
| Surfactant 1 described above | 0.058 |

(mass parts)

Herein, preparation of the light-shielding resin composition K1 described in the above Table 1 will be explained.

The light-shielding resin composition K1 was obtained by: measuring off the K pigment dispersion 1 and propylene glycol monomethyl ether acetate respectively in the amounts shown in Table 1, then mixing them at a temperature of 24° C. (±2° C.) and stirring the mixture at 150 rpm for 10 minutes, then measuring off methyl ethyl ketone, cyclohexanone, the binder 1, phenothiazine, the DPHA liquid, 2,4-bis(trichloromethyl)-6-[4'-(N,N-bisethoxycarbonylmethyl)amino-3'-bromophenyl]-s-triazine, and the surfactant 1 respectively in the amounts shown in Table 1, then adding them to the above mixture in this order at a temperature of 25° C. (±2° C.), and then stirring the resultant mixture at 150 rpm at a temperature of 40° C. (±2° C.) for 30 minutes.

In the composition shown in Table 1, the K pigment dispersion 1, the binder 1 and the DPHA liquid each had the following composition:

| * K pigment dispersion 1 | |
|---|---|
| Carbon black (trade name: Nipex 35, manufactured by Degussa, Japan) | 13.1 parts |
| Dispersant A described above | 0.65 part |
| Polymer 1 (random copolymer of benzyl methacrylate and methacrylic acid (benzyl methacrylate/methacrylic acid = 72/28 by mol), molecular weight: 37,000) | 6.72 parts |
| Propylene glycol monomethyl ether acetate | 79.53 parts |

| * Binder 1 | |
|---|---|
| Polymer (random copolymer of benzyl methacrylate and methacrylic acid (benzyl methacrylate/methacrylic acid = 78/22 by mol), molecular weight: 40,000) | 27 parts |
| Propylene glycol monomethyl ether acetate | 73 parts |

| * DPHA solution | |
|---|---|
| Dipentaerythritol hexaacrylate (containing polymerization inhibitor MEHQ at 500 ppm; manufactured by Nippon Kayaku; Trade name: KAYARAD DPHA): | 76 parts |
| Propylene glycol monomethyl ether acetate | 24 parts |

The surfactant 1 was identical with the surfactant 1 used in the thermoplastic resin layer coating liquid H1.

[Formation of Light-Shielding Barrier]

A non-alkali glass substrate was washed with a rotating brush having nylon hairs while spraying a glass cleaner liquid regulated at 25° C. by a shower for 20 seconds, then the glass substrate was washed with pure water shower. Thereafter, a silane coupling solution (a 0.3 mass % aqueous solution of N-β(aminoethyl)γ-aminopropyltrimethoxysilane, trade name: KBM603, manufactured by Shin-Etsu Chemical Co., Ltd.) was sprayed for 20 seconds by a shower, and the substrate was washed with a pure water shower. This substrate was heat-treated by a substrate pre-heating apparatus at 100° C. for 2 minutes.

The protective film of the photosensitive resin transfer material K1 was peeled off, and the substrate heated to 100° C. for 2 minutes and was laminated with the photosensitive resin transfer material K1 at a rubber roller temperature of 130° C., a linear pressure of 100 N/cm, and a conveying rate of 2.2 m/min, using a laminator (Lamic II type, manufactured by Hitachi Industries Co., Ltd.).

After the temporary support was peeled off, the photosensitive resin was pattern-exposed by using a proximity-type exposure machine having an ultrahigh pressure mercury lamp (manufactured by Hitachi High-Tech Electronics Engineering Co., Ltd) at an exposure of 100 mJ/cm² with a distance of 200 μm between the thermoplastic resin layer and the surface of the exposure mask (quartz exposure mask having image pattern), while allowing the substrate and the mask to stand straight. The mask used herein had a grid pattern, in which the radii of curvature of a salient angle on the side of the light-shielding barrier in the part corresponding to the boundary between each pixel and each light-shielding barrier was 0.6 μm.

Then, the thermoplastic resin layer and the interlayer (oxygen blocking layer) were removed by conducting shower development using a triethanolamine-series developer (containing 30% triethanolamine, T-PD2, trade name, a product of Fuji Photo Film Co., Ltd., diluted by 1/12 with purified water (or a dilute solution obtained by adding 11 parts of purified water to 1 part T-PD2)) at 30° C. for 50 seconds under a flat nozzle pressure of 0.04 MPa.

Successively thereto, the light-shielding resin layer was subjected to shower development using a sodium carbonate-series developer (a dilute solution obtained by adding 4 parts of purified water to 1 part T-CD1, wherein T-CD1 is the trade name of a product of Fuji Photo Film Co., Ltd. and composed of 0.38 mol/L of sodium hydrogen carbonate, 0.47 mol/L of sodium carbonate, 5% of sodium dibutylnaphthalenesulfonate, an anionic surfactant, an antifoaming agent and a stabilizer) at 29° C. for 30 seconds under a cone-type nozzle pressure of 0.15 MPa, thereby obtaining a barrier patterning (a pattern of a light-shielding barrier).

Successively thereto, the residue was removed by using a shower of a cleaner (T-SD3, trade name, a product of Fuji Photo Film Co., Ltd., diluted by 1/10 with purified water) and a rotating brush having nylon bristles, at 33° C. for 20 seconds, under a cone-type nozzle pressure of 0.02 MPa, thereby forming a light-shielding barrier. Thereafter, light of 500 mJ/cm² from an ultrahigh-pressure mercury lamp was applied as post exposure to the substrate, from the resin layer side, and a heat treatment at 240° C. for 50 minutes was further given to the substrate.

[Water-Repellency-Providing Plasma Treatment]

Thereafter, water-repellency-providing plasma treatment was performed in the following manner.

The light-shielding barrier-formed substrate was subjected to water-repellency-providing plasma treatment using a cathode-coupling parallel-plate plasma treatment apparatus under the following conditions;

Gas used: $CF_4$ Rate of gas flow: 80 sccm
Pressure: 40 Pa
RF power; 50 W
Treatment time: 30 sec

[Preparation of Inkjet Ink for Color Filter]

Inks were prepared according to the following manner.

TABLE 2

| Ingredient Content in Composition (parts by mass) | R ink 1 | R ink 2 | R ink 3 | R ink 4 | R ink 5 | G ink 1 | B ink 1 |
|---|---|---|---|---|---|---|---|
| Concentrated pigment liquid A (C.I.P.R. 254) | 26 | 0 | 0 | 0 | 0 | 0 | 0 |
| Concentrated pigment liquid B (C.I.P.R. 254) | 0 | 26 | 0 | 0 | 0 | 0 | 0 |
| Concentrated pigment liquid C (C.I.P.R. 254) | 0 | 0 | 26 | 0 | 0 | 0 | 0 |
| Concentrated pigment liquid D (C.I.P.R. 254) | 0 | 0 | 0 | 26 | 0 | 0 | 0 |
| Pigment E (C.I.P.R. 254) | 0 | 0 | 0 | 0 | 9 | 0 | 0 |
| G pigment (C.I.P.G. 36) | 0 | 0 | 0 | 0 | 0 | 11 | 0 |
| B pigment (C.I.P.B. 15:6) | 0 | 0 | 0 | 0 | 0 | 0 | 7 |
| Polymeric dispersant (Solsperse 20000, manufactured by AVECIA) | 1.0 | 1.0 | 1.0 | 1.0 | 1.0 | 1.0 | 1.0 |
| The above-described polymer 1 | 0 | 0 | 0 | 0 | 0 | 2.0 | 0 |
| Dipentaerythritol hexaacrylate (trade name: KAYARAD DPHA, manufactured by NIPPON KAYAKU CO., LTD.) | 6.0 | 6.0 | 6.0 | 6.0 | 6.0 | 6.0 | 6.0 |
| Alkynoyl-modified dipentaerythritol triacrylate (KAYARAD D330 manufactured by NIPPON KAYAKU CO., LTD.) | 4.0 | 4.0 | 4.0 | 4.0 | 4.0 | 4.0 | 4.0 |

TABLE 2-continued

| Ingredient Content in Composition (parts by mass) | R ink 1 | R ink 2 | R ink 3 | R ink 4 | R ink 5 | G ink 1 | B ink 1 |
|---|---|---|---|---|---|---|---|
| Phenothiazine | 0.005 | 0.005 | 0.005 | 0.005 | 0.005 | 0.005 | 0.005 |
| 1,3-Butylene glycol diacetate | 63 | 63 | 63 | 63 | 80 | 57 | 70 |
| Ink viscosity at the time of ink injection (mPa · s) | 15 | 15 | 15 | 23 | 7 | 10 | 10 |
| Ink surface tension at the time of ink injection (mN/m) | 26 | 26 | 26 | 30 | 20 | 21 | 21 |

<Viscosity>

The viscosity of ink was measured at 25° C. using an E-type viscometer (RE80L, manufactured by TOKI SANGYO CO., LTD.) under conditions that the rotor used was 1° 34'×R24 and the measurement time was 2 minutes.

<Surface Tension>

The surface tension of ink was measured at 23° C. by means of a surface tensiometer (FACE SURFACE TENSIOMETER CBVB-A3, manufactured by Kyowa Kagaku K.K.).

The mixing of the ingredients shown in Table 2 was carried out as follows: First, the pigment and the polymeric dispersant were charged into part of the solvent, mixed and stirred with a three-rod roll and a beads mill, thereby preparing a pigment dispersion liquid. Separately, the other ingredients were charged into the remainder of the solvent, dissolved and dispersed with stirring, thereby preparing a monomer solution. Then, the pigment dispersion liquid was added little by little to the monomer solution while thoroughly stirring the resulting mixture with a dissolver. Thus, an inkjet ink for color filter was prepared.

[Pixel Formation]

In Example section, strokes of ink droplets were performed in the following mode.

Inkjet heads SE-128 manufactured by Dimatrix and a discharge control device Apollo II manufactured by Dimatrix were adopted.

Each inkjet head was mounted on an automatic two-dimensional moving stage (KS211-200, manufactured by SURUGA SEIKI CO., LTD.), and ink discharge from the head was controlled by the discharge control device so that the ink in a predetermined amount was discharged onto the respective recesses partitioned by the barriers made in the foregoing manner in synchronism with the stage movement.

Herein, the foregoing inks of three colors, R ink 1, G ink 1 and B ink 1, were charged into separate heads, and each head was fastened to the X—Y stage. And the three heads were controlled independently of one another by means of the discharge control device so that each ink landed on given positions.

Strokes of ink droplets were continued until the desired density was attained by discharge of each ink composition, then drying was performed by heating at 100° C. for 2 minutes with a hot plate, and further baking in a 230° C. oven was carried out for 30 minutes. Thus, a color filter having completely cured barriers and pixels was formed.

(Formation of ITO Electrode)

A glass substrate having a color filter formed thereon was loaded in a sputter apparatus, and 1300 Å thick ITO (indium tin oxide) was vacuum deposited at 100° C. on the whole surface of the said glass substrate. Thereafter, annealing at 240° C. for 90 minutes was performed, to crystallize the ITO. Thus, ITO transparent electrode was formed.

(Formation of Spacer)

A spacer was formed on the thus-prepared ITO transparent electrode in the same manner as the spacer-forming method described in [Example 1] of JP-A-2004-240335.

(Formation of Protrusion for Controlling Orientation of Liquid Crystal)

Using a coating liquid for a positive type photosensitive resin layer described below, a protrusion for controlling orientation of liquid crystal was formed on the ITO transparent electrode formed with the above-described spacer.

Herein, exposure, development, and bake steps were carried out according to the following method.

A proximity-type exposure equipment (manufactured by Hitachi High-Tech Electronics Engineering Co., Ltd.) was set so that a certain photo mask would be located at the distance of 100 μm from the surface of the photosensitive resin layer. A proximity exposure was carried out through the said photo mask in an exposure amount of 150 mJ/cm$^2$ using an ultra-high pressure mercury lamp.

Subsequently, development was conducted by spraying a 2.38% tetramethyl ammonium hydroxide solution onto the substrate at 33° C. for 30 seconds using a shower-type developing apparatus. In this manner, unnecessary portions (exposed portions) of the photosensitive resin layer were removed by development. Thereby, on the substrate at the same side as the color filter, was formed the objective protrusion for controlling orientation of liquid crystal that was made by patterning the photosensitive resin layer into a desired shape.

After that, the substrate for a liquid crystal display device having formed thereon the protrusion for controlling orientation of the liquid crystal was baked under the conditions of 230° C. for 30 minutes. Thereby, a cured protrusion for controlling orientation of the liquid crystal was formed on the substrate for a liquid crystal display device.

| <Formulation of positive-type photosensitive-resin-layer coating liquid> | |
|---|---|
| Positive-type resist solution (FH-2413F manufactured by Fuji Film Electronics Materials) | 53.3 parts |
| Methyl ethyl ketone | 46.7 parts |
| Megafac F-780F (manufactured by Dainippon Ink & Chemicals Incorporation) | 0.04 part |

(Production of Liquid Crystal Display Devices)

An alignment film composed of polyimide was further provided on the thus-obtained substrate for a liquid crystal display device.

Thereafter, a sealing agent made of an epoxy resin was printed at the positions corresponding to the outer frame of the light-shielding barrier that was disposed so as to surround the periphery of the pixels of the color filter. In addition, after dropping thereon a liquid crystal for MVA-mode, the above-described substrate and a counter substrate were stuck together. The stuck substrates were subjected to a thermal processing to cure the sealing agent. On each surface of the thus-obtained liquid crystal cell, a polarizing plate HLC2-2518 manufactured by Sanritz Corporation was stuck together. Subsequently, a backlight with a three-wavelength cold-cathode tube light source (FWL18EX-N manufactured by Toshiba Lighting & Technology Corporation) was formed, and the backlight was set at the back side of the liquid crystal cell provided with the polarizing plates. Thus, the liquid crystal display device was produced.

Example 2

A pigment solution B, a pigment dispersion liquid B and a paste-like concentrated pigment liquid B (nanopigment concentration: 35 mass %) were prepared in the same manners as in Example 1, respectively, except that the pigment-dispersing agent A used in preparing the pigment solution A was replaced by the pigment-dispersing agent B (Exemplified Compound (c)). The number average particle diameter of the pigment fine particles determined by the same method as in Example 1 was 37 nm, and the Mv/Mn value thereof was 1.41. The pigment-dispersing agent B was synthesized in accordance with the method of producing the pigment-dispersing agent C described in JP-B-5-72943.

Next, a liquid crystal display device was produced in the same manner as in Example 1, except that R ink 1 was replaced by R ink 2 wherein the concentrated pigment liquid B was incorporated instead of the concentrated pigment liquid A as an ingredient in R ink 1.

Example 3

A pigment solution C, a pigment dispersion liquid C and a paste-like concentrated pigment liquid C (nanopigment concentration: 35 mass %) were prepared in the same manners as in Example 1, respectively, except that the pigment-dispersing agent A used in preparing the pigment solution A was replaced by the pigment-dispersing agent C (the compound represented by formula (IV)). The number average particle diameter of the pigment fine particles determined by the same method as in Example 1 was 36 nm, and the Mv/Mn value thereof was 1.40. The pigment-dispersing agent C was synthesized in accordance with the synthesizing example 1 described in JP-A-2001-31885.

Next, a liquid crystal display device was produced in the same manner as in Example 1, except that R ink 1 was replaced by R ink 3 wherein the concentrated pigment liquid C was incorporated instead of the concentrated pigment liquid A as an ingredient in R ink 1.

Comparative Example 1

In the following manner, a concentrated pigment liquid D having the composition described below was prepared with a beads-utilized dispersing machine The number average particle diameter of the pigment fine particles determined by the same method as in Example 1 was 68 nm, and the Mv/Mn value thereof was 1.50.

Next, a liquid crystal display device was produced in the same manner as in Example 1, except that R ink 1 was replaced by R ink 4 wherein the concentrated pigment liquid D was incorporated instead of the concentrated pigment liquid A as an ingredient in R ink 1.

| | |
|---|---|
| Pigment (Pigment Red 254) | 6.4 g |
| Pigment-dispersing agent A | 0.6 g |
| Polyvinylpyrrolidone (manufactured by Wako Pure Chemical Industries, Ltd., K30, molecular weight: 40,000) | 6 g |
| Methacrylic acid/benzyl methacrylate copolymer * | 15.8 g |
| Diethylene glycol monobutyl ether acetate | 45.3 g |

* molar ratio 28/72, weight average molecular weight: 30,000, 40 mass % 1-methoxy-2-propylacetate solution The pigment-dispersing agent A, a powdered pigment (Pigment Red 254), 6 g of polyvinyl pyrrolidone and a methacrylic acid-benzyl methacrylate copolymer were charged into a diethylene glycol monobutyl ether acetate solution with stirring, thereby preparing a mixture. Then, the mixture was subjected to dispersion treatment for 9 hours by using zirconia beads 0.65 mm in diameter and a Motor Mill M-50 (made by Eiger Japan Co., Ltd.) under a condition that the circumferential velocity was set at 9 m/s.

Comparative Example 2

In the following manner, a pigment E was prepared. The number average particle diameter of the pigment fine particles determined by the same method as in Example 1 was 52 nm, and the Mv/Mn value thereof was 1.76.

Next, a liquid crystal display device was produced in the same manner as in Example 1, except that R ink 1 was replaced by R ink 5 wherein the pigment E was incorporated instead of the concentrated pigment liquid A as an ingredient in R ink 1.

A pigment (Pigment Red 254) in an amount of 40 parts, pulverized sodium chloride in an amount of 400 parts, and diethylene glycol in an amount of 80 parts were added to a double-arm kneader and kneaded at a temperature of 100° C. to 110° C. for 8 hours. The mixture was then poured into 100 parts of an aqueous 1% hydrochloric acid solution at 80° C. and stirred for 1 hour. Thereafter, the mixture was filtered, washed with hot water, dried, and pulverized, so that a fined pigment E was obtained.

The reagents used in EXAMPLES are specifically the followings:

| Reagent | Manufacturer |
|---|---|
| Pigment Red 254 | Trade name: Irgaphore Red B-CF, manufactured by Ciba Specialty Chemicals company |
| Pigment Green 36 | Trade name: Rionol Green 6YK, manufactured by Toyo Ink Mfg Co., Ltd. |
| Pigment Blue 15:6 | Trade name: Rionol Blue ES, manufactured by Toyo Ink Mfg Co., Ltd. |
| Pigment Yellow 138 | Trade name: Yellow 3A1010 Fine, manufactured by SUMIKA COLOR CO., LTD. |
| Pigment Yellow 150 | Trade name: Bayplast Yellow 5GN 01, manufactured by Bayer AG |
| 1-Methyl-2-pyrrolidone | manufactured by Wako Pure Chemical Industries, Ltd. |
| Dimethylsulfoxide | manufactured by Wako Pure Chemical Industries, Ltd. |
| 2-(1-Methoxy) propyl acetate | manufactured by Wako Pure Chemical Industries, Ltd. |
| 1 mol/l hydrochloric acid | manufactured by Wako Pure Chemical Industries, Ltd. |
| Methanol solution of | manufactured by Wako Pure |

Example 4

A pigment dispersion liquid F and a paste-like concentrated pigment liquid F (nanopigment concentration: 35 mass %) were prepared in the same manners as in Example 1, respectively, except that the pigment solution A used in Example 1 was replaced by the pigment solution F. The number average particle diameter of the pigment fine particles determined by the same method as in Example 1 was 43 nm, and the Mv/Mn value thereof was 1.34.

Next, a liquid crystal display device was produced in the same manner as in Example 1, except that R ink 1 was replaced by R ink 6, and G ink 1 was replaced by G ink 2 wherein the concentrated pigment liquid F was incorporated instead of the pigment G as an ingredient in G ink 1.

*Preparation of Pigment Solution F

A pigment solution F was prepared by adding, to 100 ml of dimethyl sulfoxide, 3.3 ml of a 28% methanol solution of sodium methoxide, 6,000 mg of a pigment (Pigment Green 36), 6,000 mg of polyvinyl pyrrolidone and 600 mg of the pigment-dispersing agent A.

Example 5

A pigment solution G, a pigment dispersion liquid G and a paste-like concentrated pigment liquid G (nanopigment concentration: 35 mass %) were prepared in the same manners as in Example 4, respectively, except that the pigment-dispersing agent A used in preparing the pigment solution F was replaced by the pigment-dispersing agent B. The number average particle diameter of the pigment fine particles determined by the same method as in Example 1 was 46 nm, and the Mv/Mn value thereof was 1.37.

Next, a liquid crystal display device was produced in the same manner as in Example 1, except that R ink 1 was replaced by R ink 6, and G ink 1 was replaced by G ink 3 wherein the concentrated pigment liquid G was incorporated instead of the pigment G as an ingredient in G ink 1.

Example 6

A pigment solution H, a pigment dispersion liquid H and a paste-like concentrated pigment liquid H (nanopigment concentration: 35 mass %) were prepared in the same manners as in Example 4, respectively, except that the pigment-dispersing agent A used in preparing the pigment solution F was replaced by the pigment-dispersing agent C described above. The number average particle diameter of the pigment fine particles determined by the same method as in Example 1 was 45 nm, and the Mv/Mn value thereof was 1.35.

Next, a liquid crystal display device was produced in the same manner as in Example 1, except that R ink 1 was replaced by R ink 6, and G ink 1 was replaced by G ink 4 wherein the concentrated pigment liquid H was incorporated instead of the pigment G as an ingredient in G ink 1.

Comparative Example 3

A concentrated pigment liquid I was prepared with a beads-utilized dispersing machine in the same manner as in Comparative Example 1, except that the pigment used in Comparative Example 1 was changed to a pigment (Pigment Green 36). The number average particle diameter of the pigment fine particles determined by the same method as in Example 1 was 88 nm, and the Mv/Mn value thereof was 1.64.

TABLE 3

| Ingredient Content in Composition (parts by mass) | R ink 6 | G ink 2 | G ink 3 | G ink 4 | G ink 5 | G ink 6 | B ink 1 |
|---|---|---|---|---|---|---|---|
| R pigment (C.I.P.R. 254) | 11 | 0 | 0 | 0 | 0 | 0 | 0 |
| Concentrated pigment liquid F (C.I.P.G. 36) | 0 | 26 | 0 | 0 | 0 | 0 | 0 |
| Concentrated pigment liquid G (C.I.P.G. 36) | 0 | 0 | 26 | 0 | 0 | 0 | 0 |
| Concentrated pigment liquid H (C.I.P.G. 36) | 0 | 0 | 0 | 26 | 0 | 0 | 0 |
| Concentrated pigment liquid I (C.I.P.G. 36) | 0 | 0 | 0 | 0 | 26 | 0 | 0 |
| Concentrated pigment liquid J (C.I.P.G. 36) | 0 | 0 | 0 | 0 | 0 | 26 | 0 |
| B pigment (C.I.P.B 15:6) | 0 | 0 | 0 | 0 | 0 | 0 | 7 |
| Polymeric dispersant (Solsperse 20000, manufactured by AVECIA) | 1.0 | 1.0 | 1.0 | 1.0 | 1.0 | 1.0 | 1.0 |
| The above-described polymer 1 | 0 | 2.0 | 2.0 | 2.0 | 2.0 | 2.0 | 0 |
| Dipentaerythritol hexaacrylate (trade name: KAYARAD DPHA, manufactured by NIPPON KAYAKU CO., LTD.) | 6.0 | 6.0 | 6.0 | 6.0 | 6.0 | 6.0 | 6.0 |
| Alkynoyl-modified dipentaerythritol triacrylate (KAYARAD D330 manufactured by NIPPON KAYAKU CO., LTD.) | 4.0 | 4.0 | 4.0 | 4.0 | 4.0 | 4.0 | 4.0 |
| Phenothiazine | 0.005 | 0.005 | 0.005 | 0.005 | 0.005 | 0.005 | 0.005 |
| 1,3-Butylene glycol diacetate | 57 | 63 | 63 | 63 | 63 | 63 | 70 |
| Ink viscosity at the time of ink injection (mPa · s) | 10 | 15 | 15 | 15 | 23 | 7 | 10 |
| Ink surface tension at the time of ink injection (mN/m) | 21 | 26 | 26 | 26 | 39 | 20 | 21 |

Next, a liquid crystal display device was produced in the same manner as in Example 1, except that R ink 1 was replaced by R ink 6, and G ink 1 was replaced by G ink 5 wherein the concentrated pigment liquid I was incorporated instead of the pigment G as an ingredient in G ink 1.

Comparative Example 4

A fined pigment J was prepared with a kneading method in the same manner as in Comparative Example 2, except that the pigment used in Comparative Example 2 was changed to a pigment (Pigment Green 36). The number average particle diameter of the pigment fine particles determined by the same method as in Example 1 was 70 nm, and the Mv/Mn value thereof was 1.74.

Next, a liquid crystal display device was produced in the same manner as in Example 1, except that R ink 1 was replaced by R ink 6, and G ink 1 was replaced by G ink 6 wherein the fined pigment J was incorporated instead of the pigment G as an ingredient in G ink 1.

Example 7

A pigment dispersion liquid K and a paste-like concentrated pigment liquid K (nanopigment concentration: 35 mass %) were prepared in the same manners as in Example 1, respectively, except that the pigment solution A was replaced by the pigment solution K. The number average particle diameter of the pigment fine particles determined by the same method as in Example 1 was 45 nm, and the Mv/Mn value thereof was 1.34.

Next, a liquid crystal display device was produced in the same manner as in Example 1, except that R ink 1 was replaced by R ink 6, and G ink 1 was replaced by G ink 7.

*Preparation of Pigment Solution K

A pigment solution K was prepared by adding, to 100 ml of dimethyl sulfoxide, 3.3 ml of a 28% methanol solution of sodium methoxide, 6,000 mg of a pigment (Pigment Yellow 138), 6,000 mg of polyvinyl pyrrolidone and 600 mg of the pigment-dispersing agent A.

TABLE 4

| Ingredient Content in Composition (parts by mass) | R ink 6 | G ink 7 | G ink 8 | G ink 9 | G ink 10 | G ink 11 | B ink 1 |
|---|---|---|---|---|---|---|---|
| R pigment (C.I.P.R. 254) | 9 | 0 | 0 | 0 | 0 | 0 | 0 |
| G pigment (C.I.P.G. 36) | 0 | 6 | 6 | 6 | 6 | 6 | 0 |
| Concentrated pigment liquid K (C.I.P.Y. 138) | 0 | 20 | 0 | 0 | 0 | 0 | 0 |
| Concentrated pigment liquid L (C.I.P.Y. 138) | 0 | 0 | 20 | 0 | 0 | 0 | 0 |
| Concentrated pigment liquid M (C.I.P.Y. 138) | 0 | 0 | 0 | 20 | 0 | 0 | 0 |
| Concentrated pigment liquid N (C.I.P.Y. 138) | 0 | 0 | 0 | 0 | 20 | 0 | 0 |
| Pigment O (C.I.P.Y. 138) | 0 | 0 | 0 | 0 | 0 | 11 | 0 |
| B pigment (C.I.P.B. 15:6) | 0 | 0 | 0 | 0 | 0 | 0 | 7 |
| Polymeric dispersant (Solsperse 20000, manufactured by AVECIA) | 1.0 | 1.0 | 1.0 | 1.0 | 1.0 | 1.0 | 1.0 |
| The above-described polymer 1 | 0 | 0 | 0 | 0 | 0 | 2.0 | 0 |
| Dipentaerythritol hexaacrylate (trade name: KAYARAD DPHA, manufactured by NIPPON KAYAKU CO., LTD.) | 6.0 | 6.0 | 6.0 | 6.0 | 6.0 | 6.0 | 6.0 |
| Alkynoyl-modified dipentaerythritol triacrylate (KAYARAD D330 manufactured by NIPPON KAYAKU CO., LTD.) | 4.0 | 4.0 | 4.0 | 4.0 | 4.0 | 4.0 | 4.0 |
| Phenothiazine | 0.005 | 0.005 | 0.005 | 0.005 | 0.005 | 0.005 | 0.005 |
| 1,3-Butylene glycol diacetate | 80 | 63 | 63 | 63 | 80 | 57 | 70 |
| Ink viscosity at the time of ink injection (mPa·s) | 10 | 15 | 15 | 15 | 23 | 10 | 10 |
| Ink surface tension at the time of ink injection (mN/m) | 21 | 26 | 26 | 26 | 30 | 20 | 21 |

Example 8

A pigment solution L, a pigment dispersion liquid L and a paste-like concentrated pigment liquid L (nanopigment concentration: 35 mass %) were prepared in the same manners as in Example 7, respectively, except that the pigment-dispersing agent A used in preparing the pigment solution K was replaced by the pigment-dispersing agent B described above. The number average particle diameter of the pigment fine particles determined by the same method as in Example 1 was 48 nm, and the Mv/Mn value thereof was 1.37.

Next, a liquid crystal display device was produced in the same manner as in Example 1, except that R ink 1 was replaced by R ink 6, and G ink 1 was replaced by G ink 8.

Example 9

A pigment solution M, a pigment dispersion liquid M and a paste-like concentrated pigment liquid M (nanopigment concentration: 35 mass %) were prepared in the same manners as in Example 7, respectively, except that the pigment-dispersing agent A used in preparing the pigment solution K was replaced by the pigment-dispersing agent C. The number average particle diameter of the pigment fine particles determined by the same method as in Example 1 was 47 nm, and the Mv/Mn value thereof was 1.35.

Next, a liquid crystal display device was produced in the same manner as in Example 1, except that R ink 1 was replaced by R ink 6, and G ink 1 was replaced by G ink 9.

Comparative Example 5

A concentrated pigment liquid N was prepared with a beads-utilized dispersing machine in the same manner as in Comparative Example 1, except that the pigment used in Comparative Example 1 was changed to a pigment (Pigment Yellow 138). The number average particle diameter of the pigment fine particles determined by the same method as in Example 1 was 90 nm, and the Mv/Mn value thereof was 1.67.

Next, a liquid crystal display device was produced in the same manner as in Example 1, except that R ink 1 was replaced by R ink 6, and G ink 1 was replaced by G ink 10.

Comparative Example 6

A fined pigment O was prepared with a kneading method in the same manner as in Comparative Example 2, except that the pigment used in Comparative Example 2 was changed to a pigment (Pigment Yellow 138). The number average particle diameter of the pigment fine particles determined by the same method as in Example 1 was 72 nm, and the Mv/Mn value thereof was 1.74.

Next, a liquid crystal display device was produced in the same manner as in Example 1, except that R ink 1 was replaced by R ink 6, and G ink 1 was replaced by G ink 11.

Example 10

A pigment dispersion liquid P and a paste-like concentrated pigment liquid P (nanopigment concentration: 35 mass %) were prepared in the same manners as in Example 1, respectively, except that the pigment solution A was replaced by the pigment solution P. The number average particle diameter of the pigment fine particles determined by the same method as in Example 1 was 45 nm, and the Mv/Mn value thereof was 1.34.

Next, a liquid crystal display device was produced in the same manner as in Example 1, except that R ink 1 was replaced by R ink 6, and G ink 1 was replaced by G ink 12.

*Preparation of Pigment Solution P

A pigment solution P was prepared by adding, to 100 ml of dimethyl sulfoxide, 3.3 ml of a 28% methanol solution of sodium methoxide, 6,000 mg of a pigment (Pigment Yellow 150), 6,000 mg of polyvinyl pyrrolidone, 600 mg of EDTA and 600 mg of the pigment-dispersing agent A, and applying thereto a pressure of 10 atmospheres.

TABLE 5

| Ingredient Content in Composition (parts by mass) | R ink 6 | G ink 12 | G ink 13 | G ink 14 | G ink 15 | G ink 16 | B ink 1 |
|---|---|---|---|---|---|---|---|
| R pigment (C.I.P.R. 254) | 9 | 0 | 0 | 0 | 0 | 0 | 0 |
| G pigment (C.I.P.G. 36) | 0 | 6 | 6 | 6 | 6 | 6 | 0 |
| Concentrated pigment liquid P (C.I.P.Y. 150) | 0 | 20 | 0 | 0 | 0 | 0 | 0 |
| Concentrated pigment liquid Q (C.I.P.Y. 150) | 0 | 0 | 20 | 0 | 0 | 0 | 0 |
| Concentrated pigment liquid R (C.I.P.Y. 150) | 0 | 0 | 0 | 20 | 0 | 0 | 0 |
| Concentrated pigment liquid S (C.I.P.Y. 150) | 0 | 0 | 0 | 0 | 20 | 0 | 0 |
| Pigment T (C.I.P.Y. 150) | 0 | 0 | 0 | 0 | 0 | 11 | 0 |
| B pigment (C.I.P.B. 15:6) | 0 | 0 | 0 | 0 | 0 | 0 | 7 |
| Polymeric dispersant (Solsperse 20000, manufactured by AVECIA) | 1.0 | 1.0 | 1.0 | 1.0 | 1.0 | 1.0 | 1.0 |
| The above-described polymer 1 | 0 | 0 | 0 | 0 | 0 | 2.0 | 0 |
| Dipentaerythritol hexaacrylate (trade name: KAYARAD DPHA, manufactured by NIPPON KAYAKU CO., LTD.) | 6.0 | 6.0 | 6.0 | 6.0 | 6.0 | 6.0 | 6.0 |
| Alkynoyl-modified dipentaerythritol triacrylate (KAYARAD D330 manufactured by NIPPON KAYAKU CO., LTD.) | 4.0 | 4.0 | 4.0 | 4.0 | 4.0 | 4.0 | 4.0 |
| Phenothiazine | 0.005 | 0.005 | 0.005 | 0.005 | 0.005 | 0.005 | 0.005 |
| 1,3-Butylene glycol diacetate | 80 | 63 | 63 | 63 | 80 | 57 | 70 |
| Ink viscosity at the time of ink injection (mPa · s) | 10 | 15 | 15 | 15 | 23 | 10 | 10 |
| Ink surface tension at the time of ink injection (mN/m) | 21 | 26 | 26 | 26 | 30 | 20 | 21 |

Example 11

A pigment solution Q, a pigment dispersion liquid Q and a paste-like concentrated pigment liquid Q (nanopigment concentration: 35 mass %) were prepared in the same manners as in Example 10, respectively, except that the pigment-dispersing agent A used in preparing the pigment solution P was replaced by the pigment-dispersing agent B. The number average particle diameter of the pigment fine particles determined by the same method as in Example 1 was 48 nm, and the Mv/Mn value thereof was 1.37.

Next, a liquid crystal display device was produced in the same manner as in Example 1, except that R ink 1 was replaced by R ink 6, and G ink 1 was replaced by G ink 13.

Example 12

A pigment solution R, a pigment dispersion liquid R and a paste-like concentrated pigment liquid R (nanopigment concentration: 35 mass %) were prepared in the same manners as in Example 7, respectively, except that the pigment-dispersing agent A used in preparing the pigment solution P was replaced by the pigment-dispersing agent C described above. The number average particle diameter of the pigment fine particles determined by the same method as in Example 1 was 47 nm, and the Mv/Mn value thereof was 1.35.

Next, a liquid crystal display device was produced in the same manner as in Example 1, except that R ink 1 was replaced by R ink 6, and G ink 1 was replaced by G ink 14.

Comparative Example 7

A concentrated pigment liquid S was prepared with a beads-utilized dispersing machine in the same manner as in Comparative Example 1, except that the pigment used in Comparative Example 1 was changed to a pigment (Pigment Yellow 150). The number average particle diameter of the pigment fine particles determined by the same method as in Example 1 was 90 nm, and the Mv/Mn value thereof was 1.67.

Next, a liquid crystal display device was produced in the same manner as in Example 1, except that R ink 1 was replaced by R ink 6, and G ink 1 was replaced by G ink 15.

Comparative Example 8

A fined pigment T was prepared with a kneading method in the same manner as in Comparative Example 2, except that the pigment used in Comparative Example 2 was changed to a pigment (Pigment Yellow 150). The number average particle diameter of the pigment fine particles determined by the same method as in Example 1 was 72 nm, and the Mv/Mn value thereof was 1.74.

Next, a liquid crystal display device was produced in the same manner as in Example 1, except that R ink 1 was replaced by R ink 6, and G ink 1 was replaced by G ink 16.

[Measurement of Contrast]

Each of the R ink 1 to R ink 5 and G ink 2 to the G ink 16 was applied to a glass substrate to give a layer thickness of 2 µm to thereby produce samples. As a backlight unit, a three-wavelength cold-cathode-tube light source (FWL18EX-N manufactured by Toshiba Lighting & Technology Corporation) provided with a diffuser plate was used. Each of the samples was placed between two sheets of polarizing plates (HLC2-2518 manufactured by Sanritz Corporation), and then amounts of transmitted light at the time when polarization axes of two polarizing plates were parallel and the time when the polarization axes were perpendicular were measured. The ratio of these transmitted light amounts was defined as a contrast (see *Color Filter for* 512 *color display* 10.4"-*size TFT-LCD*, co-authored by Ueki, Koseki, Fukunaga, and Yamanaka, The seventh Color Optics Conference (1990), etc.). Chromaticity was measured using a color luminance meter (BM-5 manufactured by Topcon Techno House Corporation). The above-described two sheets of polarizing plates, sample, and color luminance meter were placed at the following positions: A polarizing plate was disposed at the distance of 13 mm from the backlight. A cylinder of 11 mm in diameter and 20 mm in length was disposed at the distance of 40 mm to 60 mm from the backlight. The light transmitted through the cylinder was irradiated to a sample to be measured disposed at the distance of 65 mm from the backlight. The transmitted light was passed through another polarizing plate disposed at the distance of 100 mm from the backlight and measured with a color luminance meter disposed at the distance of 400 mm from the backlight. The measuring angle in the color luminance meter was set to 2°. The light amount of the backlight was set so that its brightness (luminance) would be 1280 $cd/m^2$, when the two sheets of polarizing plates were arranged in a position of parallel nicol and no sample was disposed. The result of measurement of the contrast of each of the samples is shown in Table 6.

[Measurement of Color Unevenness (Measurement of Color Difference)]

Each substrate sample was examined for chromaticity in its marginal part and that in its central part by using a microspectrophotometer (OSP100 manufactured by Olympus Optics) at a pinhole diameter setting of 5 µm. Each chromaticity was expressed as values xyY in the xyz color system that were calculated as the result obtained at a visual field angle of 2 degrees to a F10 light source. And a difference between those chromaticity values (color difference of the La*b* color system) was calculated. The color difference is desirably smaller. From a chromaticity difference between those two positions, the degree of color unevenness was estimated.

[Evaluation of Continuous Drop-Stroke Correctness (Evaluation of Drop-Stroke Consistency)]

Continuous drop-stroke of each of the R ink 1 to the R ink 5 and the G ink 2 to the G ink 16 was performed with an inkjet printer and the time lapsed before the nozzle became clogged was measured. This test was repeated 10 times, and the average of data obtained was calculated.

TABLE 6

| | Sample | Contrast | Continuous Drop-Stroke Correctness (hours) | Color Difference (ΔE) |
|---|---|---|---|---|
| Example 1 | R ink 1 | 4300 | 250 | 0.1 |
| Example 2 | R ink 2 | 4200 | 230 | 0.2 |
| Example 3 | R ink 3 | 4100 | 210 | 0.1 |
| Comparative example 1 | R ink 4 | 3400 | 100 | 0.5 |
| Comparative example 2 | R ink 5 | 3900 | 80 | 0.7 |
| Example 4 | G ink 2 | 6600 | 250 | 0.1 |
| Example 5 | G ink 3 | 6300 | 240 | 0.1 |
| Example 6 | G ink 4 | 6200 | 220 | 0.2 |
| Comparative example 3 | G ink 5 | 4000 | 110 | 0.5 |
| Comparative example 4 | G ink 6 | 5200 | 90 | 0.7 |
| Example 7 | G ink 7 | 5400 | 260 | 0.1 |
| Example 8 | G ink 8 | 5000 | 240 | 0.1 |
| Example 9 | G ink 9 | 5200 | 210 | 0.2 |
| Comparative example 5 | G ink 10 | 3900 | 100 | 0.5 |
| Comparative example 6 | G ink 11 | 4000 | 90 | 0.6 |
| Example 10 | G ink 12 | 5200 | 250 | 0.1 |
| Example 11 | G ink 13 | 4900 | 240 | 0.2 |

TABLE 6-continued

| Sample | Contrast | Continuous Drop-Stroke Correctness (hours) | Color Difference (ΔE) |
|---|---|---|---|
| Example 12 | G ink 14 | 5000 | 230 | 0.2 |
| Comparative example 7 | G ink 15 | 3900 | 110 | 0.5 |
| Comparative example 8 | G ink 16 | 4000 | 100 | 0.6 |

The inks prepared using the beads dispersion method in Comparative Examples 1, 3, 5 and 7 were insufficient in all of contrast, drop-stroke consistency and evenness of color (color difference). As compared to those inks, the inks prepared using the kneading method in Comparative Examples 2, 4, 6 and 8 exhibited increases in contrast to some extent, but were still insufficient. In addition, their drop-stroke consistency and evenness of color were rather degraded. In contrast to these comparative inks, the inks according to the present invention exhibited very high contrast and excellent drop-stroke consistency and reduction in color unevenness.

[Longtime Display Test of Liquid Crystal Display Device]

Images were made to show up continuously for 1,000 hours on the screen of each of the liquid crystal display devices produced in the above. The illuminance of red light (the illuminance of light in a red-display situation) was measured in a darkroom with an illuminometer UV-M10-S (manufactured by ORC MANUFACTURING CO., LTD.) which was placed at a distance of 400 mm from the screen of each liquid crystal display device and the measuring angle of which was set at 2°. Illuminance values after the test relative to those before the test (after-test illuminance/before-test illuminance ratios) are shown in Table 7.

TABLE 7

| | Longtime Display Test of Liquid Crystal Display Device |
|---|---|
| Example 1 | 100 |
| Example 2 | 100 |
| Example 3 | 102 |
| Comparative example 1 | 115 |
| Comparative example 2 | 120 |
| Example 4 | 100 |
| Example 5 | 101 |
| Example 6 | 101 |
| Comparative example 3 | 110 |
| Comparative example 4 | 115 |
| Example 7 | 100 |
| Example 8 | 100 |
| Example 9 | 100 |
| Comparative example 5 | 105 |
| Comparative example 6 | 106 |
| Example 10 | 100 |
| Example 11 | 101 |
| Example 12 | 100 |
| Comparative example 7 | 107 |
| Comparative example 8 | 109 |

As can be seen from the results in Table 7, the liquid crystal display devices made in Examples using the inkjet inks for color filter according to the present invention suffered almost no change in illuminance even after uses for periods as long as 1,000 hours, indicating that they have excellent durability of display performance. On the other hand, the comparative display devices using the inks prepared by the conventional methods suffered considerable changes in illuminance. These results indicate that, in the color filter used in the inkjet ink for color filter according to the present invention, the reduction of color density was effectively inhibited.

Comparative Example 9

A color filter was produced in the following manner.
<Preparation of Ink>

Of the following ingredients, to begin with, the paste-like concentrated pigment solution A, the polymeric dispersant and the solvent were mixed and dispersed by means of a three-rod roll and a beads mill, thereby preparing a pigment dispersion liquid. The remainder of the ingredients were added little by little to the pigment dispersion liquid while thoroughly stirring the liquid with a dissolver or the like, thereby preparing an R ink 101.

| | |
|---|---|
| Paste-like concentrated pigment liquid A | 14 parts |
| Polymeric dispersant (Solsperse 24000, manufactured by AVECIA) | 1 part |
| Binder (Glycidyl methacrylate-styrene copolymer) | 3 parts |
| First epoxy resin (Novolak epoxy resin, EPIKOTE154, manufactured by Yuka Shell Epoxy Co., Ltd.) | 2 parts |
| Second epoxy resin (Neopentyl glycol diglycidyl ether) | 5 parts |
| Curing agent (Trimellitic acid) | 4 parts |
| Solvent (Ethyl 3-ethoxypropionate) | 71 parts |

Among the above ingredients, the ethyl 3-ethoxypropionate used as the solvent was the standard liquid specified by the wettability test in accordance with JIS K6768. The contact angle of this solvent was measured after a 30-second lapse from the contact of a drop thereof. Specifically, the contact angle of this solvent with respect to the surface of a sample piece having a critical surface tension of 30 mN/m determined from the Zisman Plot graph was 18°, and the contact angle with respect to the surface of a sample piece having a critical surface tension of 70 mN/m determined from the Zisman Plot graph was 0°.

In the same tests as the above, the neopentyl glycol diglycidyl ether used as the second epoxy resin had a contact angle of 37° with respect to a sample piece having a critical surface tension of 30 mN/m, while it had a contact angle of 0° with respect to the surface of a sample piece having a critical surface tension of 70 mN/m.

Further, a G ink 101 was prepared in the same manner as the Red ink 101, except that 14 parts of the paste-like concentrated pigment solution A in the foregoing composition was replaced with the same amount of paste-like concentrated pigment solution F. Furthermore, a B ink 101 was prepared in the same manner as the Red ink 101, except that 14 parts of the paste-like concentrated pigment solution A in the foregoing composition was changed to 5 parts of C.I.P.B. 15:6 and the content of ethyl 3-ethoxypropionate as the solvent was changed to 80 parts.

<Production of Color Filter>

The R ink 101 was dropped from a head onto the center of each of red pixel section forming areas in a dot diameter of 30 μm. Likewise, the G ink 101 was dropped from a head onto the center of each of green pixel section forming areas in a dot diameter of 30 μm. Further, the B ink 101 was dropped from a head onto the center of each of blue pixel section forming areas in a dot diameter of 30 μm Each colored pigment ink dropped on each individual color pixel section was rejected by unirradiated portions on each barrier and spread evenly over each individual color pixel section forming area, and further adhered thereto selectively.

Thereafter, the colored pigment dispersion layer of each color was subjected to vacuum drying at 80° C. for 3 minutes, and then cured by 60 minutes' heating in a 200° C. oven, thereby forming pixel sections. In the next place, a two-part mixing type thermosetting agent (SS7265, manufactured by JSR Corporation) was coated on the pixel sections by means of a spin coater, and then subjected to 30 minutes' curing treatment at 200° C., thereby forming a protective layer. Thus, a color filter 101 was obtained.

A liquid crystal display device was produced using the color filter 101 in the same manner as in Example 1, and submitted to the foregoing longtime display test for liquid crystal display device. The after-test value of this display device relative to the before-test value was 120, so this display device was inferior in display durability. From the above results, it is understood that the incorporation of the polymerizable monomer and/or the polymerizable oligomer into the inkjet ink for color filter is required for producing the color filter having excellent properties.

INDUSTRIAL APPLICABILITY

In the inkjet ink for color filter of the present invention, pigment fine particles of nanometer sizes are dispersed in a state of sharp particle size distribution. Therefore, the inkjet ink of the present invention can avoid ink-nozzle clogging under injecting; and makes it possible to produce the color filter in accordance with an inkjet method, with rapidity and efficiency, and the lowered production cost. As a result, the color filter according to the present invention is favorable for use in applications such as liquid crystal display device and the like.

The organic fine particles obtained by the production method according to the present invention have a nanometer size and are monodispersion particles, give excellent optical properties when used in color filter, and are thus favorable for use in applications such as liquid crystal display device and CCD device.
having a size in the order of nanometer and a sharp particle-diameter distribution peak In addition, the inkjet ink for color filter of the present invention is favorable for use in producing the color filter having high contrast and no roughness at the surface; and besides that is prevented from developing color unevenness and suffering a decrease in color density even when used for a long time.

Further, the color filter of the present invention is used to favorable for use in producing the liquid crystal display device having excellent display performance such as excellent blackness and color reproducibility, improvement in display irregularity and retention of high display-quality even under use for a long time.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An inkjet ink for a color filter, comprising:
an organic medium;
fine pigment particles formed with a size on the order of a nanometer, said particles being dispersed in said organic medium; and
a polymerizable monomer and/or a polymerizable oligomer in the organic medium,
wherein said fine pigment particles are obtained by:
providing a pigment solution of a pigment dissolved in a solvent that is a good solvent for said pigment;
providing a solvent which is compatible with said good solvent but which is a poor solvent for said pigment;
including a dispersing agent in the pigment solution and/or in said poor solvent prior to mixing them; and
mixing the pigment solution with said poor solvent to form fine pigment particles having a size on the order of a nanometer.

2. The inkjet ink of claim 1, wherein the dispersing agent is a polymeric dispersing agent.

3. The inkjet ink of claim 1, wherein the dispersing agent is a compound of formula (I)

   Formula (I)

wherein

A is a component capable of forming an azo dye upon coupling with a diazonium compound, X is a single bond or a divalent connecting group selected from those of formulas (i) to (v)

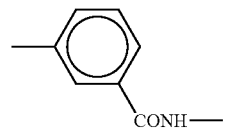   Formula (i)

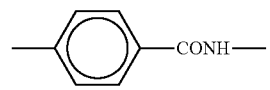   Formula (ii)

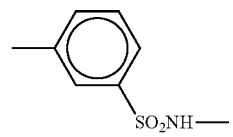   Formula (iii)

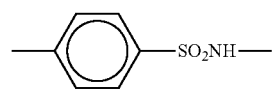   Formula (iv)

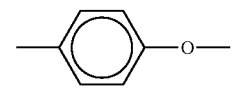   Formula (v)

and

Y is

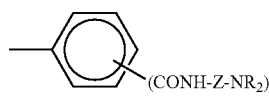   Formula (II)

wherein a represents 1 or 2, Z is a group of the formula $-(CH_2)_b-$ in which b represents an integer of from 1 to 5, and the group $-NR_2$ is $-N(C_nH_{2n+1})_2$ wherein n represents an integer of from 1 to 4, or the group $-NR_2$ is a nitrogen-containing, 5- or 6-membered, saturated heterocyclic group.

4. The inkjet ink of claim 1, wherein the dispersing agent is a compound of formula (III)

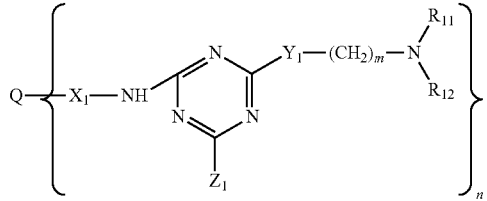
Formula (III)

wherein:
- Q is a residue of an organic dye selected from anthraquinone-series dyes, azo-series dyes, phthalocyanine-series dyes, quinacridone-series dyes, dioxazine-series dyes, anthrapyrimidine-series dyes, anthanthrone-series dyes, indanthrone-series dyes, flavanthrone-series dyes, pyranthrone-series dyes, perynone-series dyes, perylene-series dyes, and thioindigo-series dyes;
- $X_1$ is —CONH—$Y_2$—, —$SO_2$NH—$Y_2$—, or —$CH_2$NHCO$CH_2$NH—$Y_2$—, wherein $Y_2$ is an alkylene group or an arylene group, each of which may be substituted;
- $Y_1$ is —NH— or —O—;
- $Z_1$ is a hydroxyl group or a group represented by formula (IIIa)

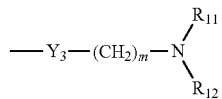
Formula (IIIa)

wherein $Y_3$ is —NH— or —O—, m is an integer of 1 to 6, and $R_{11}$ and $R_{12}$ each independently is a substituted or unsubstituted alkyl group, or $R_{11}$ and $R_{12}$ represent groups that bond together to form a heterocyclic group which contains a nitrogen atom;

$R_{11}$ and $R_{12}$ in formula (III) each independently is a substituted or unsubstituted alkyl group, or $R_{11}$ and $R_{12}$ represent groups that bond together to form a heterocyclic group which contains a nitrogen atom;

m in formula (III) is an integer of 1 to 6; and n in formula (III) is an integer of 1 to 4.

5. The inkjet ink of claim 1, wherein the dispersing agent is a graft copolymer comprising (i) a polymerizable oligomer having an ethylenically unsaturated double bond at a terminal, (ii) a nitrogen-containing monomer having a nitrogen atom and an ethylenically unsaturated double bond, and (iii) a polymerizable monomer having an ether group, wherein said graft copolymer has a weight-average molecular weight in a range of from 3000 to 100,000.

* * * * *